(12) United States Patent
Lin et al.

(10) Patent No.: US 7,738,596 B2
(45) Date of Patent: Jun. 15, 2010

(54) HIGH SPEED DATA SERVICE VIA SATELLITE MODEM TERMINATION SYSTEM AND SATELLITE MODEMS

(75) Inventors: Dorothy D. Lin, Irvine, CA (US); Rocco J. Brescia, Jr., Newport Coast, CA (US); Jen-chieh Chien, Lake Forest, CA (US); Adel F. Fanous, Irvine, CA (US); Alan Gin, Corona Del Mar, CA (US); Mark R. Dale, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 1423 days.

(21) Appl. No.: 10/661,648

(22) Filed: Sep. 12, 2003
(Under 37 CFR 1.47)

(65) Prior Publication Data

US 2004/0105403 A1 Jun. 3, 2004

Related U.S. Application Data

(60) Provisional application No. 60/410,870, filed on Sep. 13, 2002, provisional application No. 60/448,588, filed on Feb. 20, 2003.

(51) Int. Cl.
*H04B 7/19* (2006.01)
*H04B 7/15* (2006.01)
*H04B 7/185* (2006.01)
*H04L 27/28* (2006.01)

(52) U.S. Cl. .................. 375/316; 375/295; 455/12.1; 455/13.2; 455/11.1; 455/3.02

(58) Field of Classification Search .................. 375/260, 375/295, 316, 300, 302, 309, 320, 322, 329, 375/334; 455/12.1, 13.2, 23, 17, 39, 42, 455/91, 102, 3.02, 427, 11.1
See application file for complete search history.

(56) References Cited

U.S. PATENT DOCUMENTS 5,406,570 A 4/1995 Berrou et al.
(Continued)

FOREIGN PATENT DOCUMENTS

EP 0 681 382 A2 11/1995
(Continued)

OTHER PUBLICATIONS

Alessi et al, "Adapting The DOCSIS Protocols for Military Point to Multipoint wireless Links", MILCOM 2000 21st Century Military Communications Conference Proceedings, vol. 1, pp. 80-84, Oct. 22-25, 2000.*

(Continued)

*Primary Examiner*—David C Payne
*Assistant Examiner*—Linda Wong
(74) *Attorney, Agent, or Firm*—Sterne, Kessler, Goldstein & Fox P.L.L.C.

(57) ABSTRACT

A satellite communication system includes a satellite earth station operably coupled to a data network, and a plurality of satellite modems, each satellite modem of the plurality of satellite modems communicating in an upstream and downstream data communication mode with the satellite earth station via at least one servicing satellite. The satellite earth station includes a host processor for receiving data packets from the data network and processing DOCSIS management packets, a DOCSIS MAC coupled to the host processor for encrypting the transmit packet data from the host memory, framing data in MAC headers and inserting MAC timestamps in the transmit packet data, a satellite modulator coupled to the DOCSIS MAC for modulating the encrypted transmit packet data to generate downstream output data for transmission to at least one of the plurality of satellite modems, a burst demodulator for demodulating upstream data received from at least one of the plurality of satellite modems, and a turbo decoder coupled to the burst demodulator and the DOCSIS MAC for turbo decoding the demodulated data from the burst demodulator and sending the decoded data to the DOCSIS MAC. The DOCSIS MAC sends DOCSIS management packets portion of the decoded data to the host processor and sends transmit packet data portion of the decoded data to the data network.

15 Claims, 14 Drawing Sheets

U.S. PATENT DOCUMENTS

| | | | |
|---|---|---|---|
| 5,446,747 | A | 8/1995 | Berrou |
| 5,563,897 | A | 10/1996 | Pyndiah et al. |
| 5,926,501 | A * | 7/1999 | Souissi et al. ............... 375/131 |
| 6,065,147 | A | 5/2000 | Pyndiah et al. |
| 6,070,074 | A | 5/2000 | Perahia et al. |
| 6,119,264 | A | 9/2000 | Berrou et al. |
| 6,122,763 | A | 9/2000 | Pyndiah et al. |
| 6,169,728 | B1 | 1/2001 | Perreault et al. |
| 6,459,703 | B1 | 10/2002 | Grimwood et al. |
| 6,594,467 | B2 | 7/2003 | Asia et al. |
| 6,598,203 | B1 * | 7/2003 | Tang ........................ 714/790 |
| 6,625,118 | B1 | 9/2003 | Salim et al. |
| 6,650,624 | B1 * | 11/2003 | Quigley et al. .............. 370/252 |
| 6,690,655 | B1 | 2/2004 | Miner et al. |
| 6,741,555 | B1 | 5/2004 | Li et al. |
| 6,742,187 | B1 | 5/2004 | Vogel |
| 6,801,537 | B1 | 10/2004 | Kubbar |
| 6,804,532 | B1 | 10/2004 | Moon et al. |
| 6,807,193 | B1 | 10/2004 | Beser |
| 6,836,515 | B1 * | 12/2004 | Kay et al. ................... 375/260 |
| 6,853,680 | B1 | 2/2005 | Nikolich |
| 6,977,741 | B2 | 12/2005 | Eldridge et al. |
| 6,993,007 | B2 | 1/2006 | Gummalla et al. |
| 7,002,914 | B2 | 2/2006 | Cloonan |
| 7,002,941 | B1 * | 2/2006 | Treadaway et al. .......... 370/338 |
| 7,050,419 | B2 * | 5/2006 | Azenkot et al. ............. 370/347 |
| 7,139,247 | B2 | 11/2006 | Desai et al. |
| 7,145,888 | B2 | 12/2006 | Dale et al. |
| 7,190,737 | B2 * | 3/2007 | Okamoto .................... 375/286 |
| 7,197,276 | B2 * | 3/2007 | Dale et al. ................. 455/3.01 |
| 7,203,158 | B2 | 4/2007 | Oshima et al. |
| 7,310,522 | B2 * | 12/2007 | Geile ......................... 455/424 |
| 2001/0034867 | A1 * | 10/2001 | Jaffe et al. .................. 714/746 |
| 2001/0039600 | A1 * | 11/2001 | Brooks et al. ............... 710/126 |
| 2001/0055319 | A1 * | 12/2001 | Quigley et al. .............. 370/480 |
| 2002/0009051 | A1 | 1/2002 | Cloonan |
| 2002/0021711 | A1 | 2/2002 | Gummalla et al. |
| 2002/0027886 | A1 * | 3/2002 | Fischer et al. ............... 370/255 |
| 2002/0031120 | A1 * | 3/2002 | Rakib ......................... 370/386 |
| 2002/0036985 | A1 | 3/2002 | Jonas et al. |
| 2002/0061012 | A1 * | 5/2002 | Thi et al. .................... 370/352 |
| 2002/0122465 | A1 * | 9/2002 | Agee et al. .................. 375/141 |
| 2002/0136231 | A1 * | 9/2002 | Leatherbury et al. ........ 370/442 |
| 2002/0159506 | A1 * | 10/2002 | Alamouti et al. ............ 375/147 |
| 2002/0163932 | A1 * | 11/2002 | Fischer et al. ............... 370/465 |
| 2003/0026283 | A1 | 2/2003 | Currivan et al. |
| 2003/0053435 | A1 * | 3/2003 | Sindhushayana et al. .... 370/342 |
| 2003/0058794 | A1 | 3/2003 | Pantelias et al. |
| 2003/0067991 | A1 * | 4/2003 | Okamoto .................... 375/262 |
| 2003/0069926 | A1 | 4/2003 | Weaver et al. |
| 2003/0083054 | A1 * | 5/2003 | Francesca et al. ........... 455/418 |
| 2003/0147411 | A1 | 8/2003 | Goosman |
| 2003/0176161 | A1 * | 9/2003 | Dale et al. ................. 455/3.01 |
| 2003/0206559 | A1 * | 11/2003 | Trachewsky et al. ........ 370/509 |
| 2003/0206561 | A1 * | 11/2003 | Schmidl et al. ............. 370/522 |
| 2004/0006771 | A1 | 1/2004 | Dale et al. |
| 2004/0017830 | A1 | 1/2004 | Dale et al. |
| 2004/0022307 | A1 | 2/2004 | Dale et al. |
| 2004/0162020 | A1 | 8/2004 | Dale et al. |
| 2005/0141460 | A9 * | 6/2005 | Currivan et al. ............. 370/335 |
| 2007/0147281 | A1 | 6/2007 | Dale et al. |
| 2007/0256001 | A1 * | 11/2007 | Suzuki et al. ............... 714/774 |

FOREIGN PATENT DOCUMENTS

| | | |
|---|---|---|
| EP | 0 735 696 A1 | 10/1996 |
| EP | 1 387 546 A2 | 2/2004 |
| FR | 2 675 970 A1 | 10/1992 |
| WO | WO 01/89123 A1 | 11/2001 |
| WO | WO 03/092203 A2 | 11/2003 |
| WO | WO 03/092204 A2 | 11/2003 |

OTHER PUBLICATIONS

Kim, "Turbo-coded OFDM system for a mobile satellite broadcasting system", Vehicular Technology Conference, 2001, vol. 4, pp. 2945-2949, May 6-9, 2001.*

European Search Report for EP 03 01 7352, dated Oct. 27, 2006, 2 pages.

Alessi, George et al., "Adapting the DOCSIS Protocols for Military Point-to Multipoint Wireless Links," MILCOM 2000. 21st Century Military Communications Conference Proceedings, Oct. 22-25, 2000, Piscataway, NJ, pp. 80-84.

Arunachalam, Arun, "Global Standardization Efforts of BWI Systems Based on Cable Modem," Emerging Technologies Symposium: Broadband, Wireless Internet Access, 2000 IEEE Apr. 10-11, 2000, Piscataway, NJ, pp. 1-4.

D'Luna, Lionel J. et al., "A Single-Chip Universal Cable Set-Top Box/Modem Transceiver," IEEE Journal of Solid-State Circuits, IEEE Service Center, Piscataway, NJ, vol. 34, No. 11, Nov. 1999, pp. 1647-1660.

Research and Development: Communications/ Turbo Coding, from http://www.xenotran.com/turbo_ tech_error_turbo.html, 5 pages (last visited Mar. 11, 2002).

Ryan, W.E., "A Turbo Code Tutorial," Proc. IEEE Globecom '98, IEEE, 9 pages (1998).

Telecommunications and Mission Operations Directorate—DSN Technology Program, from http://www331.jpl.nasa.gov/public/TurboForce.GIF, 1 page (last visited Mar. 11, 2002).

Valenti, M.C., "Turbo codes and Iterative Processing," IEEE New Zealand Wireless Communications Symposium, 42 pages including tutorial slides (Nov. 1998).

Data-Over-Cable Service Interface Specifications, Radio Frequency Interface Specification, SP-RFIv1.1-I09-020830, Cable Television Laboratories, Inc., 1999-2002.

Digital Video Broadcasting (DVB); Interaction Channel for Satellite Distribution Systems,ETSI EN 301 790 v1.2.2 (Dec. 2000), European Telecommunications Standards Institute, European Broadcasting Union, 2000, 99 pgs.

International Search Report for International Application No. PCT/US03/12642, dated Dec. 18, 2003, 6 pages.

International Search Report issued Nov. 14, 2003 for Appln. No. PCT/US03/12645, 6 pages.

* cited by examiner

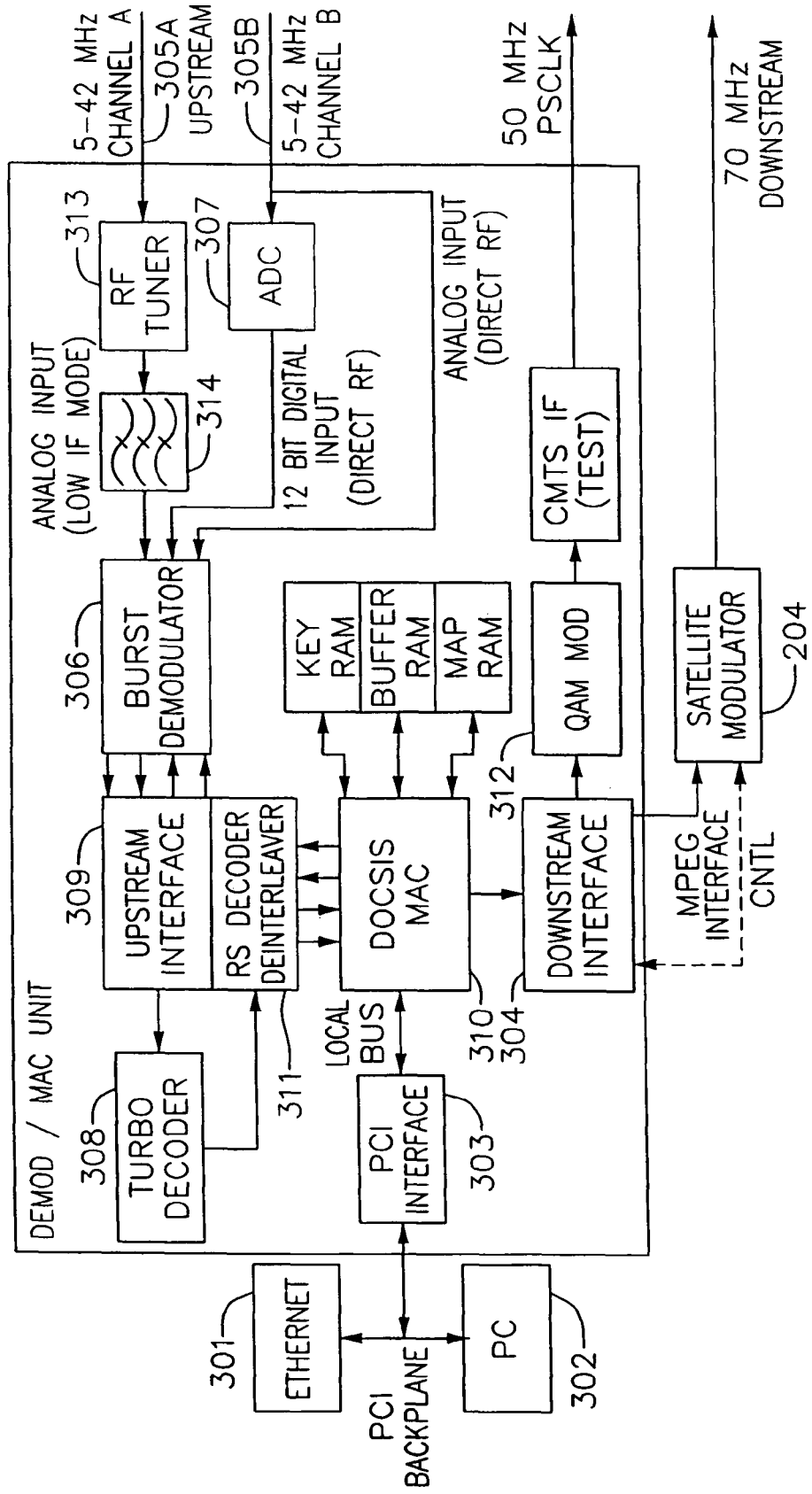

HIGH SPEED DATA SERVICE VIA SATELLITE MODEM TERMINATION SYSTEM AND SATELLITE MODEMS

CROSS-REFERENCE TO RELATED APPLICATION

This patent application claims the benefit of the filing date of U.S. Provisional Patent Application Ser. No. 60/410,870, filed Sep. 13, 2002 and entitled "HIGH SPEED DATA SERVICE VIA SATELLITE MODEM TERMINATION SYSTEM AND SATELLITE MODEMS"; and No. 60/448,588, filed Feb. 20, 2003 and entitled "HIGH SPEED DATA SERVICE VIA SATELLITE MODEM TERMINATION SYSTEM AND SATELLITE MODEMS"; the entire contents of which are hereby expressly incorporated by reference.

FIELD OF THE INVENTION

The present invention relates generally to wireless communications. More specifically, the invention relates to a satellite based data communication system and method.

BACKGROUND OF THE INVENTION

Communication technologies that link electronic devices in a networked fashion are well known. Examples of communication networks include wired packet data networks, wireless packet data networks, wired telephone networks, wireless telephone networks, and satellite communication networks, among other networks. These communication networks typically include a network infrastructure that services a plurality of client devices. The Public Switched Telephone Network (PSTN) is probably the best-known communication network that has been in existence for many years. The Internet is another well-known example of a communication network that has also been in existence for a number of years. These communication networks enable client devices to communicate with each other on a global basis. Wired Local Area Networks (LANs), e.g., Ethernet, are also quite common and support communications between networked computers and other devices within a serviced area. LANs also often link serviced devices to Wide Area Networks and the Internet. Each of these networks is generally considered a "wired" network, even though some of these networks, e.g., the PSTN, may include some transmission paths that are serviced by wireless links.

One common data network architecture, specified as the Data Over Cable Service Interface Specification (DOCSIS) is a standard developed for cable data communications. The goal of DOCSIS is to define a data service that will allow transparent bi-directional transfer of Internet Protocol (IP) traffic between a cable system headend or Cable Modem Termination System (CMTS) and customer locations using a cable modem (CM), over an all-coaxial or hybrid-fiber/coax (HFC) cable network.

A DOCSIS Media Access Control (MAC) utilizes a time division multiple access (TDMA) technique to facilitate communications between cable modems and the Cable Modem Termination System (CMTS), or headend, in the upstream path (i.e. from subscriber to head-end). DOCSIS TDMA access is accomplished by assigning upstream time slots within which cable modems transmit their messages to the headend. Each timeslot granted to a modem is an integer number of minislots, which are the basic MAC timing unit for allocation and granting TDMA slots. In DOCSIS, minislot timing is derived from the MAC global time reference clock, such that each minislot begins and ends upon a rising edge of the clock.

The DOCSIS MAC sublayer specifies that the CMTS provide a single carrier transmitter for each downstream (i.e. from head-end to subscriber) channel. All CMs at subscriber locations listen to all frames transmitted on the downstream channel upon which they are registered and accept those frames where the destinations match the CM itself or CPEs (customer premises equipment). CMs can communicate with other CMs only through the CMTS.

The upstream channel is thus characterized by many transmitters (CMs) and one receiver (the CMTS). Time in the upstream channel is slotted, providing for TDMA at regulated time ticks. The CMTS provides the time reference and controls the allowed usage for each interval. Intervals may be granted for transmissions by particular CMs, or for contention by all CMs. CMs may contend to request transmission time. To a limited extent, CMs may also contend to transmit actual data. In both cases, collisions can occur and retries are then used.

The DOCSIS MAC transmits a 32 bit timestamp message derived from the 10.24 MHz global time reference at the CMTS in the downstream channel to all subscribers for the purpose of upstream transmission synchronization. Subscriber modems use this timestamp message to produce a local version of the global time reference that is synchronized to the CMTS clock.

The DOCSIS protocol has been adapted to other types of media, including terrestrial fixed wireless and two way satellite. For these applications, as well as the original data over cable service, data is transferred between a central location and many remote subscribers. Satellite communication systems include a satellite earth station, a satellite, and a plurality of satellite receivers. The satellite earth station includes a large satellite dish and servicing satellite earth station electronics. Satellite receivers include relatively smaller satellite dishes and also include servicing electronics. Historically, satellite communication systems were used for the broadcast of television and radio programming. However, satellite communication systems have also been used for servicing data communications. Early satellite communication systems delivered data downstream via the satellite receiver. However, upstream data was typically received via a different data path, e.g., dial-up modem.

Newer satellite communication systems that service data communications receive upstream data via the satellite and satellite earth station. Thus, in such systems, the customer equipment includes not only a receiver but also a transmitter. While the newer satellite communication systems have the advantage of servicing both downstream and upstream communications via the satellite communication path, the serviced data rates are slow. Thus, heretofore, satellite communication systems that service data communications have provided lesser data rates than other systems, e.g., cable modem systems, Digital Subscriber Line systems, etc.

Therefore, there is a need for an improved satellite communication system that provides adequate service for both downstream and upstream data communications.

SUMMARY OF THE INVENTION

In one embodiment of the invention a satellite communication system includes: a satellite earth station operably coupled to at least one data network; and a plurality of satellite modems, each satellite modem of the plurality of satellite modems communicating in an upstream and downstream data communication mode with the satellite earth station via at least one servicing satellite, wherein the satellite earth station includes: a host processor for receiving data packets from the at least one data network and processing DOCSIS management packets, a DOCSIS MAC coupled to the host processor for encrypting the transmit packet data from the host memory, framing data in MAC headers and inserting MAC timestamps in the transmit packet data, a satellite modulator coupled to the DOCSIS MAC for modulating the encrypted transmit packet data to generate downstream output data for transmission to at least one of the plurality of satellite modems, a burst demodulator for demodulating upstream data received from at least one of the plurality of satellite modems, and a turbo decoder coupled to the burst demodulator and the DOCSIS MAC for decoding the demodulated data from the burst demodulator and sending the decoded data to the DOCSIS MAC, wherein the DOCSIS MAC sends DOCSIS management packets portion of the decoded data to the host processor and sends transmit packet data portion of the decoded data to the at least one data network.

In one embodiment of the invention a method for a two-way satellite communication in compliance with DOCSIS standard includes: receiving a radio frequency (RF) upstream signal; demodulating the received RF signal to generate soft decision quadraphase-shift keying (QPSK) output signal; turbo decoding the QPSK output signal; decoding the turbo decoded output signal by a Reed-Solomon (RS) decoder; assembling DOCSIS packets in the RS decoded signal; and forwarding the assembled data to a data network.

BRIEF DESCRIPTION OF THE DRAWINGS

The objects, advantages and features of this invention will become more apparent from a consideration of the following detailed description and the drawings in which:

FIG. 3 illustrates an exemplary Burst Demodulator, a Host Processor, and a Satellite Modulator, according to one embodiment of the present invention;

DETAILED DESCRIPTION

In standard DOCSIS based systems such as those described above, the downstream transmission is defined to be a time division multiplexed (TDM) signal with a fixed modulation type as well as a fixed forward error correction (FEC) coding rate. Thus by nature, the downstream signal has a fixed spectral efficiency in bits per second/Hertz [bps/Hz]. Signal parameters such as the modulation type, FEC coding type, and FEC coding rate determine the minimum signal to noise ratio (SNR) that must be present for a satellite modem (SM) to have error-free or quasi error-free operation in a given channel having those parametric limitations. Thus, there is an inherent trade-off between the values of receiver parameters that yield a high level of throughput (e.g. high-order modulation and high FEC code rates) and those values (e.g. low-order modulation and more robust but lower FEC code rates) that ensure that the signal can be reliably received under conditions of low SNR, but with lower throughput.

In many real world environments, subscribers of such systems experience a wide range of path losses and channel degradations. One example is a satellite based system where a downstream spot beam broadcasts to satellite modems (SMs) that are located over a wide geographic area. Various conditions such as localized rainfall, partial obstructions, antenna misalignments, etc. can significantly degrade the signal power levels (and thus SNRs) received by individual subscribers. Those of average skill in the art will recognize that similar channel degradation may be experienced for subscribers of terrestrial fixed wireless and even data over cable, although the causes may be different.

Figure 1:
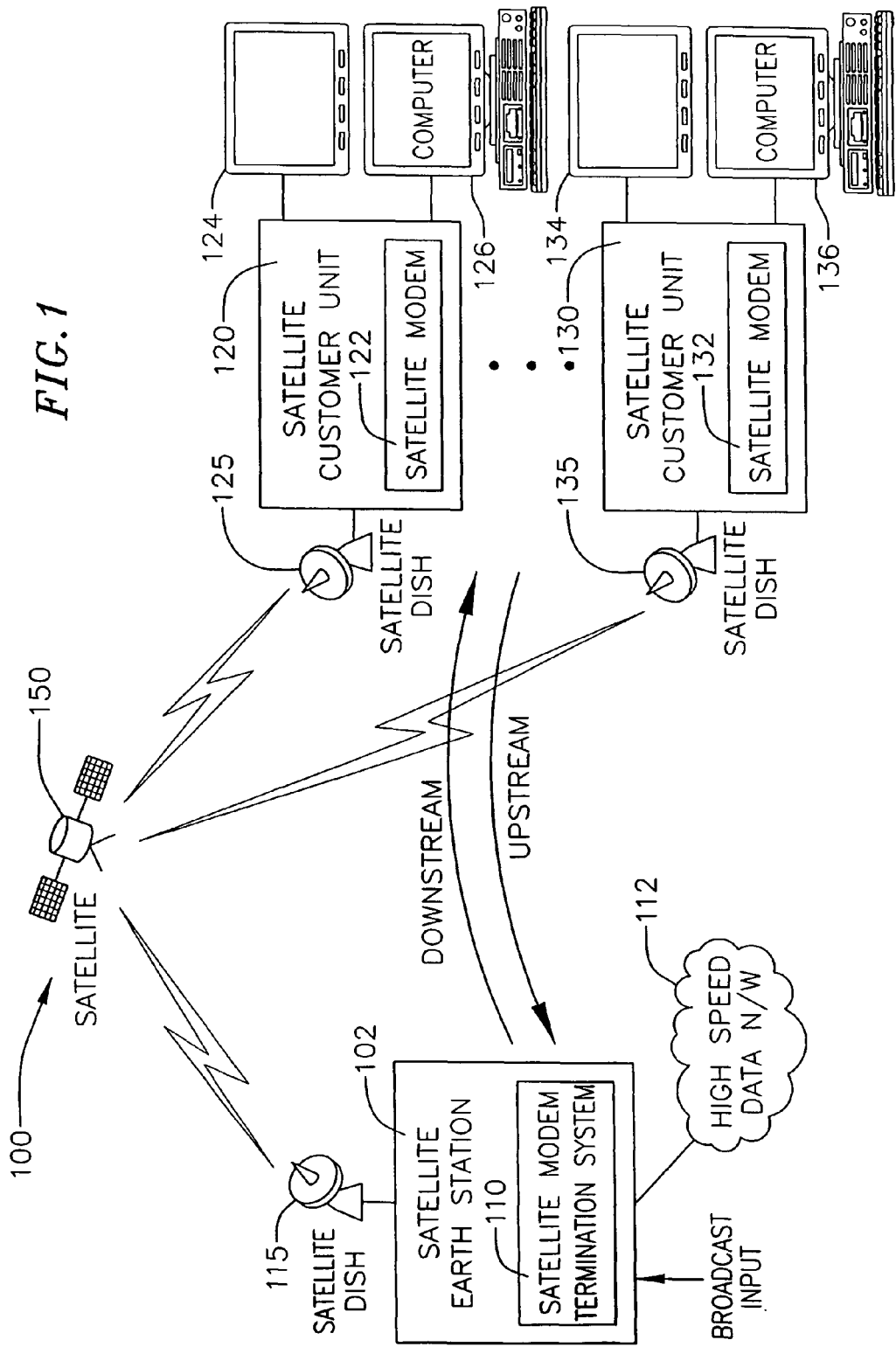
FIG. 1 is an exemplary system diagram illustrating a satellite communication system 100, according to one embodiment of the present invention.

FIG. 1 is an exemplary system diagram illustrating a satellite communication system 100, according to one embodiment of the present invention. A satellite earth station 102 includes a satellite modem termination system (SMTS) 110. The satellite earth station 102 communicatively couples to a plurality of satellite customer units 120 and 130 via a servicing satellite 150 and satellite dishes 125 and 135, respectively. In the satellite communication system 100 of FIG. 1, the satellite earth station 102 provides both broadcast and data service to the plurality of satellite customer units 120 and 130.

The satellite earth station 102 communicatively couples to a high speed data network 112 which employs to service customer data communications according to the present invention. The satellite earth station 102 also receives broadcast input for broadcasting to the plurality of satellite customer units 120 and 130. Each of the plurality of customer units 120 and 130 includes a satellite modem (SM), 122 and 132 respectively, that interacts with the satellite modem termination system 110 to provide data service to coupled terminals 126 and 136, respectively. Video terminals, or other similar systems, 124 and 134, receive broadcast programming via servicing satellite customer units 120 and 130, respectively. It is understood that video terminal 124 and terminal 126 may be embodied in a single device. The system is capable of supporting multiple datatypes, such as voice, video, and data simultaneously and on prioritized basis.

Figure 2:
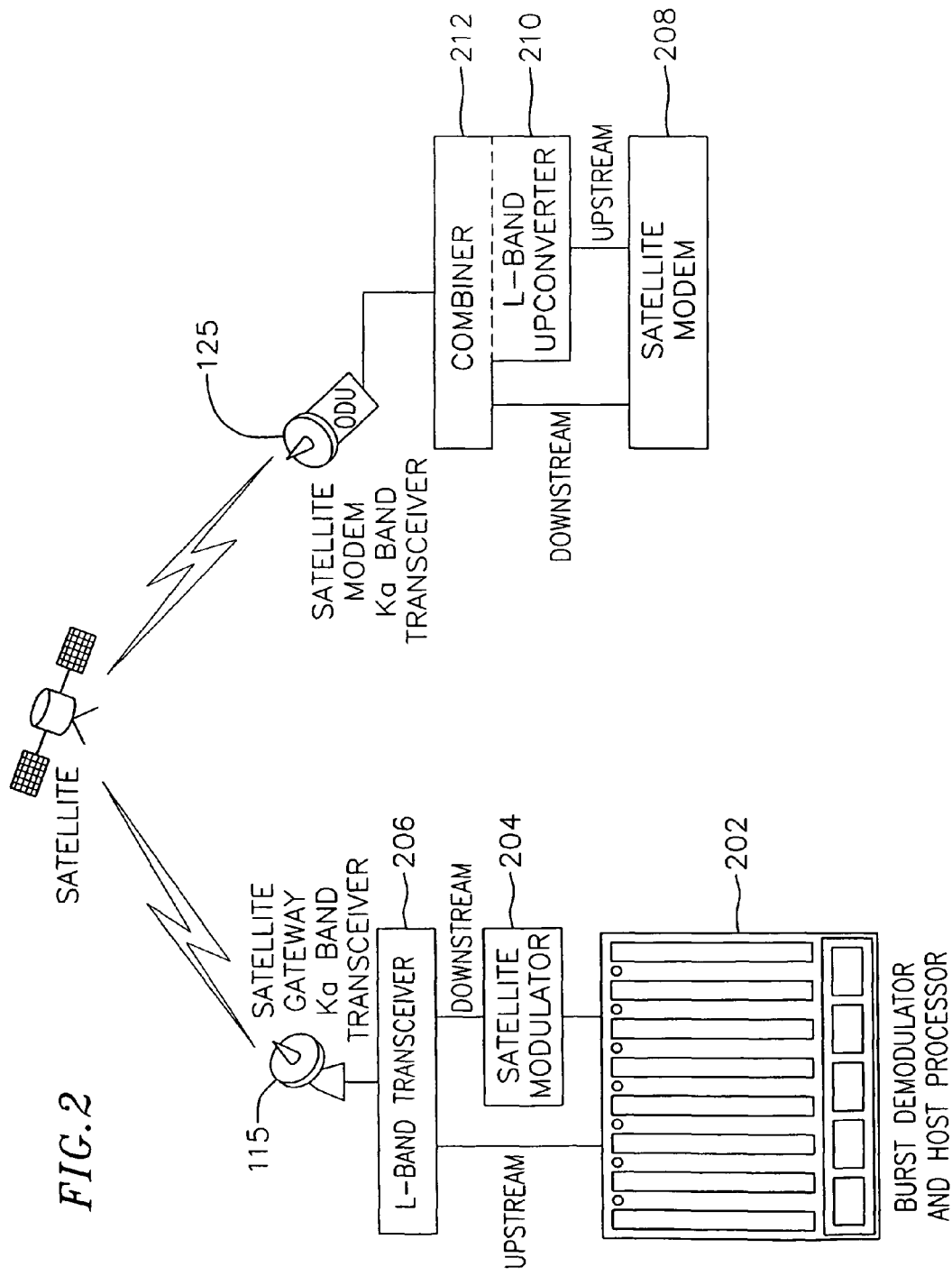
FIG. 2 is an exemplary system diagram illustrating with differing detail the satellite communication system of FIG. 1.

FIG. 2 illustrates with differing detail the satellite communication system of FIG. 1. In particular, the satellite earth station 102 includes a burst demodulator & Host Processor 202, a satellite modulator 204, and an L-band Transceiver 206 in addition to the satellite dish 115. Each customer unit includes a SM 208, an L-band Upconverter 210, and a combiner 212, in addition to a satellite dish 125.

FIG. 3 illustrates the burst demodulator & Host Processor 202 of FIG. 2 and the satellite modulator 204 (in FIG. 2) of the satellite earth station 102 (in FIG. 1), according to one embodiment of the invention. The system is a point-to-multipoint network, with a broadcast TDM channel from the SMTS 110 to subscriber SM 122 and 132 and a TDMA channel from SMs to SMTS. The MAC protocol is based on the DOCSIS MAC. In one embodiment, the Demod/MAC is embodied in a pluggable circuit board card typically resident in a PCI chassis along with a personal computer (PC) and a 100 BaseT Ethernet interface satellite modulator 204 is typically an external unit. An exemplary DOCSIS-based MAC is the BCM3210 MAC chip from Broadcom Corp.

Figure 4A:
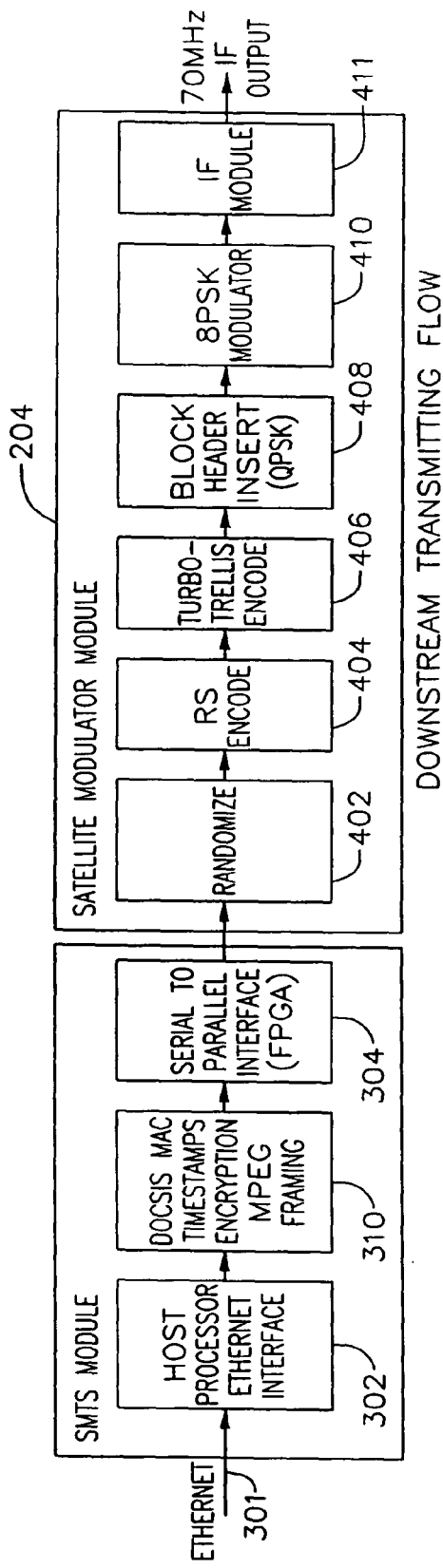
FIGS. 4A-4B summarize downstream and upstream transmit signal flows, according to one embodiment of the present invention.
Figure 4B:
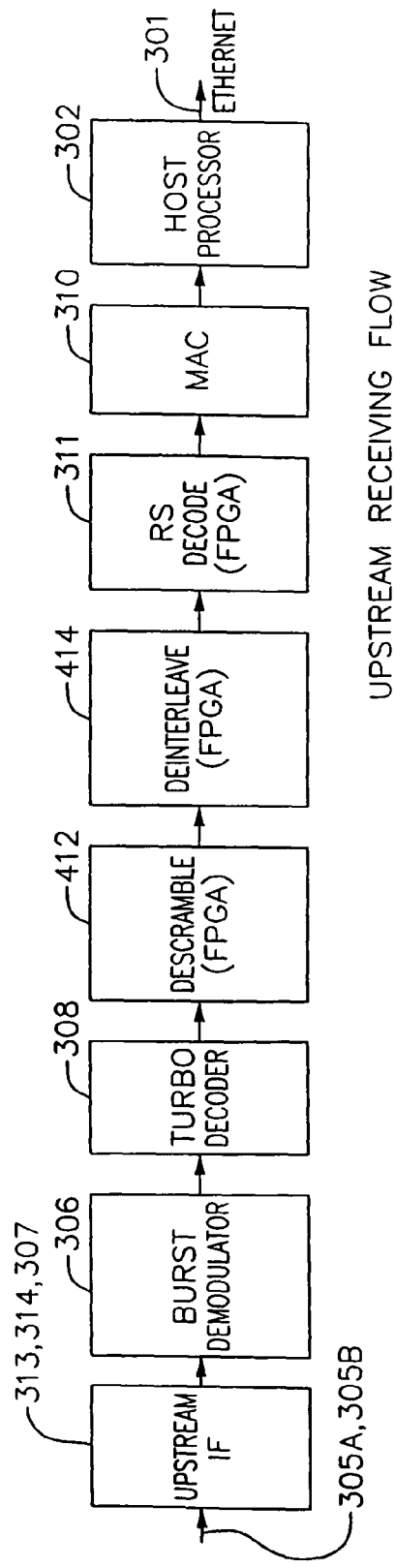

An exemplary operation of the present system is described below with respect to FIGS. 3, 4A, and 4B. The downstream transmit signal flow from the SMTS to the SMs is summarized in FIG. 4A. Transmit packet data arrives at the SMTS module via the Ethernet port 301. The Ethernet packets, along with MAC management messages, are moved from host memory to the MAC via a PCI bus connected to PCI interface 303. The MAC encrypts the data as necessary and frames the data in MAC headers. MAC 310 also inserts MAC timestamps in the transmit stream. The data stream is then encapsulated in Motion Picture Expert Group (MPEG) frames, which are output serially to the downstream circuit 304. In one embodiment, downstream circuit 304 in implemented in a field programmable gate array (FPGA) integrated circuit. Downstream circuit 304 includes a serial-to-parallel interface that re-formats the data into a byte-wide stream and forwards these bytes to the satellite modulator unit 204. The modulator unit randomizes this data using a Randomize unit 402, and applies the downstream concatenated code. The coded data is RS encoded by the RS encoder 404, and turbo encoded by the turbo encoder 406. Block headers are then inserted by block 408 and the data is then modulated by 8PSK modulator 410 and IF modulator 411 to generate a final output 70 MHz IF signal. Downstream transmission modes are outlined in Table 1, according to one embodiment of the invention.

TABLE 1

Downstream tranmistter operating modes

| Parameter | Settings |
|---|---|
| Modulation | quadraphase-shift keying (QPSK), 8PSK |
| Symbol Rate | 15 Msym/sec |
| Spectral Shaping | 20% Excess Bandwidth |
| Spectral Inversion | Programmable at Satellite Modulator |
| Turbocode Trellis Code Rate | ½ (QPSK) |
|  | ⅔, ⅚ (8PSK) |
| Reed-Solomon Code |  |
| Generator Polynomial | $G(x) = \prod_{i=0}^{18} (x - \alpha^i)$ |
| Primitive Polynomial | $p(x) = x^{10} + x^3 + 1$ |
| T | 10 |
| N | Shortened to fit one turbocoded block. |
| Scrambler |  |
| PRBS Sequence Generator | $1 + x^{14} + x^{15}$ |
| Initialization String (LSB to MSB) | 100101010000000 |

Upstream data transmissions from the SMs to the SMTS are described with reference to FIGS. 3 and 4B. In this embodiment, the receiver input should be an IF signal in the range of 5 MHz to 42 MHz. There are two radio frequency (RF) input channels 305A and 305B. As shown in FIG. 3, input channel 305A is mixed to a low IF by RF tuner 313 and filter 314 for input to channel A of the burst demodulator 306. An exemplary burst demodulator is the BCM3138 Burst Demodulator chip from Broadcom Corp. Input channel 305B is passed directly to the burst demodulator Channel B analog input as well as to an analog-to-digital converter (ADC) 307 for direct RF sampling. The 12 bit output from the ADC is connected to the 12 bit digital Channel B input of the burst demodulator 306. The soft decision quadraphase-shift keying (QPSK) output from the demodulator 306 is passed to a turbo decoder 308 via an upstream circuit 309. In one embodiment, downstream circuit 304 in implemented in a field programmable gate array (FPGA) integrated circuit.

The decoded output is then descrambled by descramble unit 412, deinterleaved by deinterleave unit 414, and handed off to a Reed-Solomon (RS) decoder 311. The error corrected packet data is assembled with a PHY prepend used to report signal quality and status. An exemplary turbo decoder is the BCM4500 Turbo Decoder chip from Broadcom Corp.

This data is then forwarded to the DOCSIS MAC 310. The host 302 processes DOCSIS management packets, such as bandwidth requests or ranging packets. Ethernet data packets not destined for the host are forwarded to the Ethernet interface 301. Table 2 summarizes the upstream receiving operating modes, according to one embodiment of the invention.

TABLE 2

Upstream receiver operating modes

| Parameter | Settings |
|---|---|
| Modulation | QPSK |
| Symbol Rates | 160, 320, 640, 1280 and 2560 Ksym/sec |
| Symbol Mapping | DOCSIS |
| Spectral Shaping | 25% Excess Bandwidth |
| Turbocode |  |
| Rate | ½ |
| Block Size (Including tailing symbols) | 284 symbols |
| Tailing Symbols | 4 symbols |
| Reed-Solomon Code |  |
| Generator Polynomial | DOCSIS |
| Primitive Polynomial | DOCSIS |
| T | [1, 2, . . . 10] |
| N | An integer number of Turbocode blocks. (Each Turbocode block contains 35 bytes of data) |
| Shortened Last Codeword | No |
| Interleaver | Block Byte Interleaver. Block size K*35, K = {0, 1, 2 . . . 7}. |
| Scrambler | DOCSIS |
| Preamble |  |
| Modulation | QPSK Only. |
| Nominal Length | 128 (TBR) symbols |

In one embodiment, MAC 310 is controlled by the host 302 via direct PCI memory mapped register accesses. In one embodiment, the burst demodulator, the turbo decoder, the FPGAs, and the satellite modulator 204 are controlled via an SPI interface of the MAC 310. The modulator 204 has an I2C interface, so the SPI input to the downstream FPGA 304 is bridged to the modulator's I2C interface. In this embodiment, the SPI interface of the MAC can control up to 12 peripherals.

Programming of downstream and upstream FPGA's 304 and 309 is accomplished via a single on-board FPGA EEPROM. In circuit programming via a JTAG port is also possible for debugging. The upstream IF module control signaling for the mixer frequency, and gain setting is handled directly by burst demodulator 306.

TABLE 3

Control Interface Summary

| Device under control | Control Interface Type | Controlling Device |
|---|---|---|
| PLX 9080 | PCI | Host processor |
| MAC | Local Bus | Host processor |
| BURST DEMODULATOR | SPI | MAC |
| TURBO DECODER | SPI | MAC |
| Upstream FPGA | SPI | MAC |
| Downstream FPGA | SPI | MAC |
| Modulator Board | I2C | MAC via SPI to I2C Bridge in Downstream FPGA |
| Rx IF Module | Gain and Tuner | BURST DEMODULATOR |

In one embodiment, the SMTS produces a modulated IF signal with the specifications of Table 4.

TABLE 4

SMTS Modulator Output

| Parameter | Value |
|---|---|
| Center Frequency (Fc) | 70 MHz ± 30 kHz |
| Level | 0 to −20 dBm in 1 dB increments |
| Modulation Type | QPSK and 8PSK |
| Symbol Rate (nominal) | 15.0 Msym/sec |
| Nominal Signal Bandwidth | 18.0 MHz |
| Frequency response | 20% Square Root Raised Cosine shaping |
| Total Discrete Spurious Inband (fc ± 7.5 MHz) | <−40 dBc |
| Inband Spurious and Noise (fc ± 7.5 MHz) | <−35 dBc; where channel spurious and noise includes all discrete spurious, noise, carrier leakage, clock lines, synthesizer products and other undesired transmitter products. Noise within 1% of the symbol rate (150 kHz) of the carrier is excluded. |
| Phase Noise (dBc/Hz) | |
| @ 100 Hz offset | −65 |
| @ 1 kHz offset | −75 |
| @ 10 kHz offset | −95 |
| >100 kHz offset | −110 |
| Output Impedance | 50 ohms |
| Connector | F connector per [IPS-SP-406] |

In one embodiment, the SMTS operates at a Burst Error Rate of $10^{-4}$ with the inputs specified in Table 5. Upstream performance parameters are engineering estimates based on simulation results.

TABLE 5

SMTS Demodulator Input

| Parameter | Value |
|---|---|
| Center Frequency (fc) | 5 MHz to 42 MHz |
| Carrier Frequency Offset | <6% of Symbol rate |
| Input Signal Level | −15 to +35 dBmV |
| Modulation Type | QPSK |
| Symbol Rate (nominal) | 160, 320, 640, 1280, 2560 Ksym/sec |

TABLE 5-continued

SMTS Demodulator Input

| Parameter | Value |
|---|---|
| Frequency response | 25% Square Root Raised Cosine shaping |
| Input SINR | 9 dB |
| Phase Noise (dBc/Hz) | |
| @ 100 Hz offset | −30 |
| @ 1 kHz offset | −60 |
| @ 10 kHz offset | −77 |
| @ 100 kHz offset | −92 |
| @ 1 MHz offset | −112 |
| @ >10 MHz offset | −137 |
| Amplitude Ripple (5 to 65 MHz) | 0.5 dB/MHz |
| Group Delay Ripple (5-65 MHz) | 200 ns/MHz |
| Input Impedance | 75 ohms (DOCSIS) |
| Input Return Loss | >6 dB (88-860 MHz) |
| Connector | F connector per [IPS-SP-406] |

In one embodiment, the system operates with a maximum round trip transmission delay of 500 ms.

Figure 5:
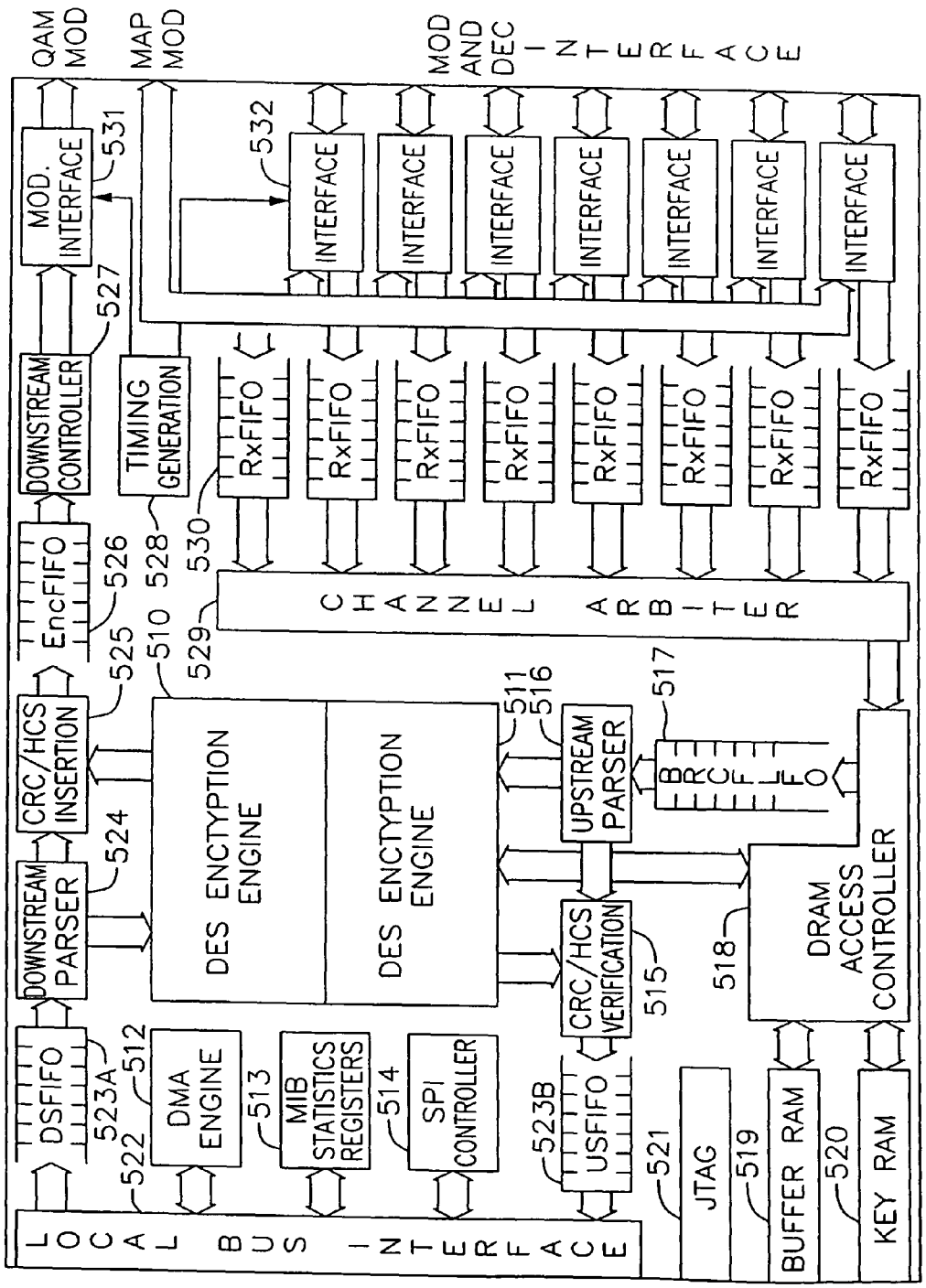
FIG. 5 is an exemplary block diagram of a DOCSIS MAC, according to one embodiment of the present invention.

FIG. 5 is an exemplary block diagram of a MAC 500, according to one embodiment of the present invention. SPI controller 514 and DMA engine 512 support a downstream channel and up to eight upstream channels simultaneously through the bus interface 522 and FIFOs 523*a* and 523*b*, respectively. A JTAG interface 521 is also provided for test and debugging interface. Downstream data is read from FIFO 523*a* by the downstream parser 524. The data is then encrypted by DES encryption engine 510 and then CRC headers and Header Check Sum (HCS) are inserted by CRC/HCS insertor 525. The encrypted data is then buffered in FIFO 526 and then passed to the Mod interface 531 by the downstream controller 527. Timing signals are provided by the timing generation module 528.

For the upstream data, FIFOs 530 buffer the data received from interface 532. Channel arbiter 529 selects the appropriate data channel and DRAM access controller 518 accesses Buffer RAM 519 and Key RAM 520 for appropriate data header insertion before data is sent to the DES decryption engine 511 via FIFO 517 and upstream parser 516. CRC and HCS verification on upstream packets CRC/HCS headers are performed by block 515 before data is sent to the bus interface 522.

In this embodiment, the MAC provides the following functionality, among others:
  Formats downstream data into MPEG frames,
  Inserts DOCSIS Time stamps at programmed intervals,
  Provides an upstream PHY interface for serial data and Maps,
  Provides a downstream PHY serial interface,
  Performs DES encryption and decryption,
  Performs CRC and Header Check Sum (HCS) verification on upstream packets,
  Calculates and inserts CRC and HCS on downstream packets,
  Provides SPI Interface for programming PHY devices, and
  Interfaces to PLX bridge.

Referring back to FIG. 3, in one embodiment, SMTS MAC has a single upstream channel for normal operation and one for SMTS test mode operation. The SMTS MAC interfaces to the upstream interface rather than the burst demodulator 306. This configuration is shown in FIG. 3 with respect to modulator 312. The downstream interface is connected to the downstream interface which reformats the MAC serial output into parallel MPEG data. The MAC is configured similar to a configuration for a DOCSIS Annex B operation in clock sinking mode. The MAC receives its downstream serial interface clock (PSCLK) from the downstream interface of the satellite modulator 204.

The MAC interfaces are summarized in Table 6, according to one embodiment of the invention.

TABLE 6

MAC Interfaces

| Module Name | Description |
|---|---|
| Downstream Interface FPGA | MODULATOR Serial Interface connection of the MAC is configured in clock sinking mode. The Downstream FPGA sources PSCLK. SPI Interface. |
| Upstream Interface FPGA | Serial upstream data. Three wire serial interface. Map interface. Three wire serial MAP Data interface and Minislot Clock. (Output) SPI Interface |
| MAP RAM | 64k × 16 SRAM (Input/Output) |
| Key RAM | 1M × 16 DRAM (Input/Output) |
| Buffer RAM | 1M × 16 DRAM (Input/Output) |
| Local Bus Interface | (Input/Output) |
| MODULATOR | SPI Interface |
| TURBO DECODER | SPI Interface |

Figure 6:
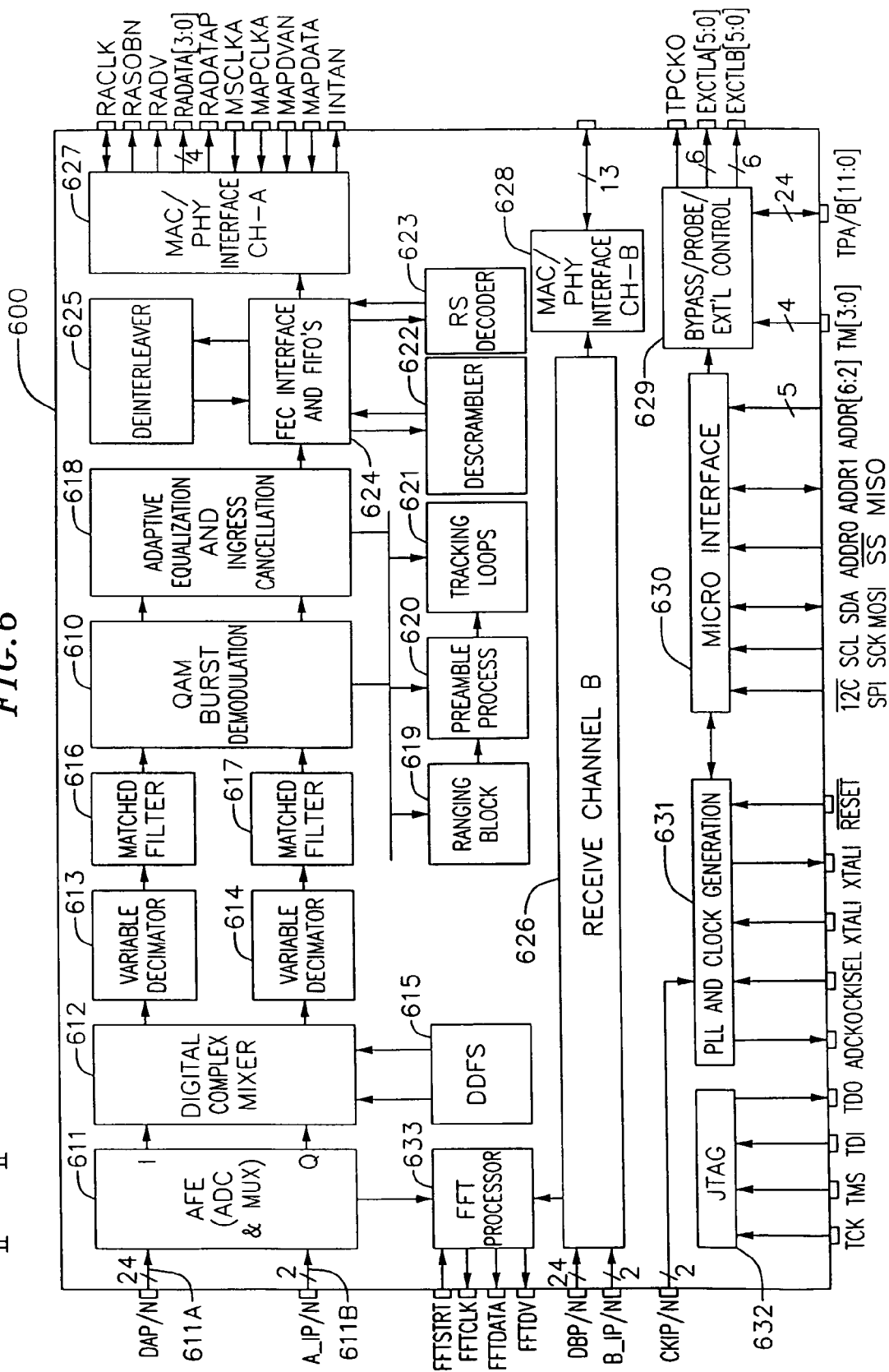
FIG. 6 is an exemplary block diagram of a burst demodulator, according to one embodiment of the present invention.

FIG. 6 is an exemplary block diagram of a burst demodulator, according to one embodiment of the present invention. The burst demodulator performs the upstream burst demodulator function. In the normal operating mode for the SMTS, the burst demodulator is configured to output soft decision data on a pair of test port outputs to the upstream circuit (e.g., 309 in FIG. 3). In one embodiment, the burst demodulator provides two independent receivers that accept QPSK and m-QAM (Quadrature Amplitude) burst data in frequency-agile, time division multiple access (TDMA) schemes. Other capabilities include an analog front end (AFE), a QAM demodulator, a generalized equalizer, and an enhanced Reed Solomon (RS) forward error correction (FEC) decoder with dynamic deinterleaving.

Referring to FIG. 6, AFE 611 provides coarse gain setting and analog-to-digital conversion (ADC) on the IF input 611a and I/Q inputs 611b using a FFT processor 633. A digital mixer 612 coupled with a DDFS unit 615 translates the desired signal at RF to true DC where the I and Q samples pass through variable decimators (613 & 614), and matched raised-cosine filters 616 & 617. A QAM burst demodulator 610 performs word detection of programmable length and pattern in the burst preamble for signal acquisition. An adaptive equalizer & Ingress cancellation unit 618 characterizes the RF channel response, cancels ingress noise and removes inter-symbol interference (ISI) caused by micro-reflections in the channel. The ranging block 619, preamble process block 620, and tracking loops block 621 help the QAM demodulator 610 and the adaptive equalizer & Ingress cancellation unit 618 perform their respective functions in a timely manner.

The FEC decoding comprises a programmable de-scrambler 622, a programmable RS decoder 623 with T values programmable up to 16, a byte deinterleaver 625, and FEC interface and FIFOs 624. Channel B data is received by receiver 626 and output by the interface 628. Timing generation is performed by PLL & timing generator 631. A microcontroller interface 630 and external controls 629 are included for smooth programming of the burst controller. Additionally, a JTAG 632 interface is included for test and debugging purposes.

Signal quality measurement is reported in PHY prepend header output on the burst demodulator MAC/PHY serial output interface 627 to the upstream circuit (309 in FIG. 3). Either channel A or channel B data can be mapped to the soft decision output pins, which means that any of the available RF input signal modes can be used on the satellite data. The prepend header is modified in the upstream circuit to reflect the results of the RS decoder in that device.

In one embodiment, the burst demodulator is configured for a RS codeword size matching the turbo coded block size of each RS codeword. In one embodiment, the block size is an integer multiple of 71 bytes, and the error correcting parameter T is set to an arbitrary value of 2. This causes the burst demodulator to output one PHY prepend header per RS codeword. The Channel A analog front end of the device is configured to receive the low IF signal produced by the IF module. The burst demodulator controls the upstream IF circuit gain and mixer frequency through its external control pins. Channel B is configured to either accept a direct RF analog input and use its internal ADC to sample, or configured to accept the 12 bit output from an external ADC.

The burst demodulator Interfaces are summarized in Table 7, according to one embodiment of the invention.

TABLE 7

Burst Demodulator Interfaces

| Module Name | Description |
|---|---|
| Upstream FPGA | FFT Interface. 4 signal serial interface. May be post-processed and used for channel quality measurements. (Output) Soft Decision Data Interface: (Output) TPA[11:1] and TPB[11:1] I and Q data. Format [2.9]. QPSK levels (0.5, 0.5) Data Valid: TPA[0] Clock: TPCK0 Channel A MAC/PHY Interface (Output). Four signal serial data interface. Used in this case to collect Prepend data in the FPGA. MAP Interface (Routed from the MAC) (Input) |
| MAC | SPI Slave Interface (Input/Output) |
| IF Input (Channel A) | Analog input interface. (Input) Differential input at low IF (e.g., 6 MHz). Gain control. Pulse Width Modulated signal. (Output) Mixer control. Three signal serial digital control to the PLL (Output) |
| RF Input (Channel B) | Analog input interface. (Input) Differential input at RF (e.g., 5 to 42 MHz) ADC Interface (Input) Optional RF input mode. 12 bit output from ADC |

In this embodiment, the burst demodulator receives a 20.48 MHz from a clock driver on the board when operating Channel A in the low IF mode and when operating Channel B in the analog input direct RF mode. When Channel B is configured to accept input from the external ADC, it receives a 102.4 MHz clock from an external PLL.

Figure 7:
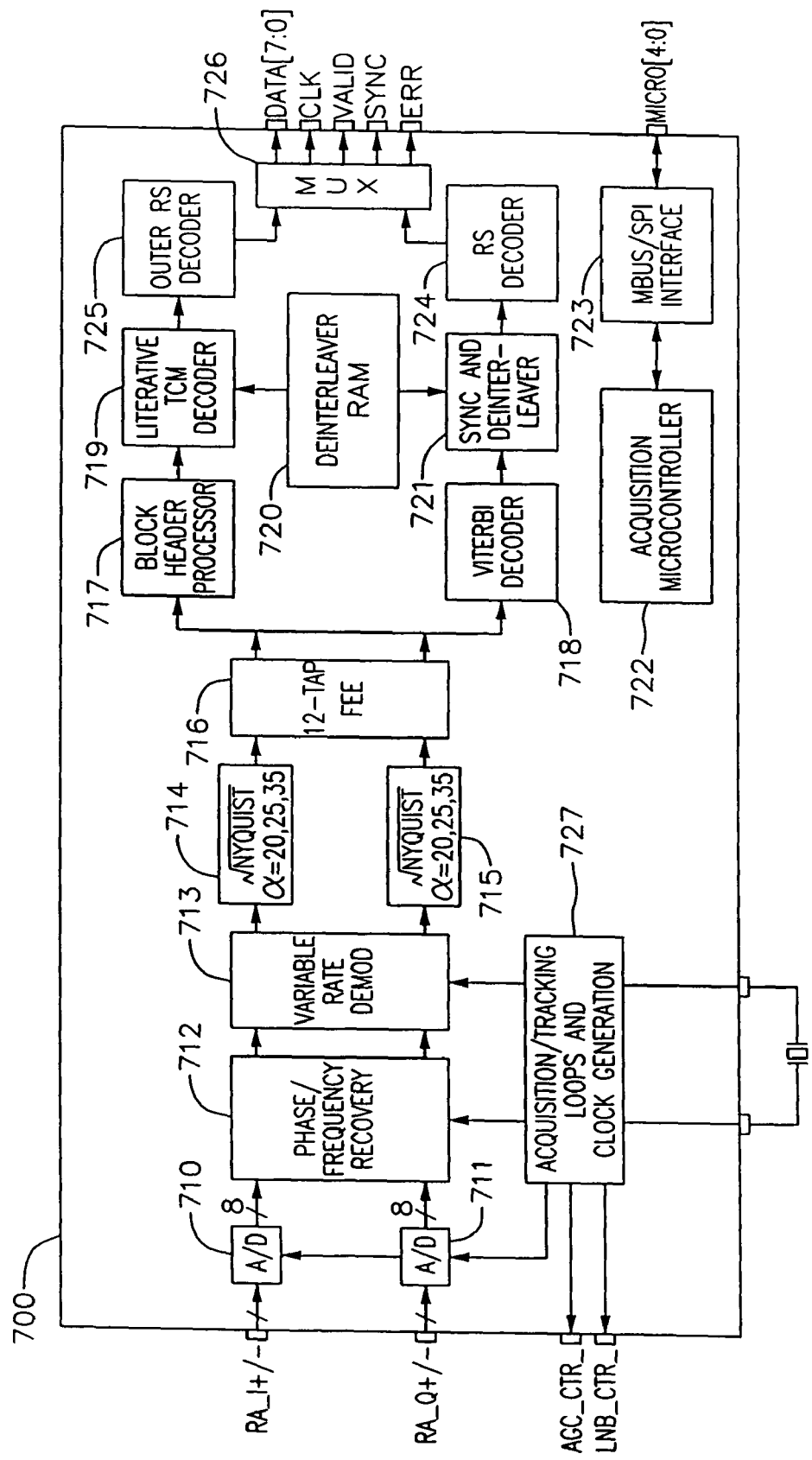
FIG. 7 is an exemplary block diagram of a turbo decoder, according to one embodiment of the present invention.

FIG. 7 is an exemplary block diagram of a turbo decoder, according to one embodiment of the present invention. The turbo decoder provides the turbo decoding function for the SMTS. As shown in FIG. 7, dual ADCs 710 and 711 sample the baseband IQ analog waveforms. The phase & frequency of the sampled waveform is recovered by unit 712, and the resulting signal is demodulated by a variable demodulator 713. The phase/frequency recovery module 712 is capable of removing residual phase and frequency offsets in the baseband signal. The demodulator signal is then filtered by Nyquist filters 714 and 715. Optimized soft decisions are then fed into either a FEC decoder, or a turbo decoder by a 12-tap FFE unit 716. The FEC decoder includes a block header processor 717, an iterative TCM decoder 719, and an RS decoder 725, as shown. The turbo decoder includes a Viterbi decoder 718, a synchronization and deinterleaver 721, and a RS decoder 724. A deinterleaver RAM 720 stores the appropriate data for iterative TCM decoder 719 and synchronization and deinterleaver 721. The error corrected output is delivered in MPEG or DIRECTV transport format through the multiplexor 726. Output clock is generated by PLL and clock generation circuit 727. Unit 727 also performs the acquisition and tracking loops functions for the blocks 712 and 713.

The turbo decoder also includes a simplified user interface including a microcontroller 722 for system configuration, acquisition, control, and monitoring functions. System interface to the turbo decoder in through a simplified high-level application programmer interface (API) 723. The turbo decoder also includes a DiSEqC™ controller for two-way communication with LNBs.

In this embodiment, the turbo decoder is used in a mode that bypasses the demodulator circuit as well as the RS decoder. Soft decision I and Q symbol data from the burst demodulator, reformatted in the upstream FPGA (309 in FIG. 3), is inserted directly at the input to the turbo decoder block. The decoded data is returned to the upstream FPGA via a serial interface.

An exemplary input block size is 284 symbols. Since the turbo decoder provides the data interface clock to the upstream FPGA without reference to the actual upstream symbol clock, it is programmed to operate at a 5.12 Msym/sec rate. The turbo decoder interfaces are summarized in Table 8, according to one embodiment of the invention.

TABLE 8

Turbo Decoder Interfaces

| Module Name | Description |
| --- | --- |
| Upstream FPGA | I/Q Input Data Interface<br>8 Bits I and Q Data (Input) Format [1.7], QPSK Symbols (0.707, 0.707)<br>Data Valid (Input)<br>Data Clock (Output)<br>I2C (M-BUS) Interface (Unused) |
| MAC | SPI Serial Control Interface (Input/Output) |

Figure 8:
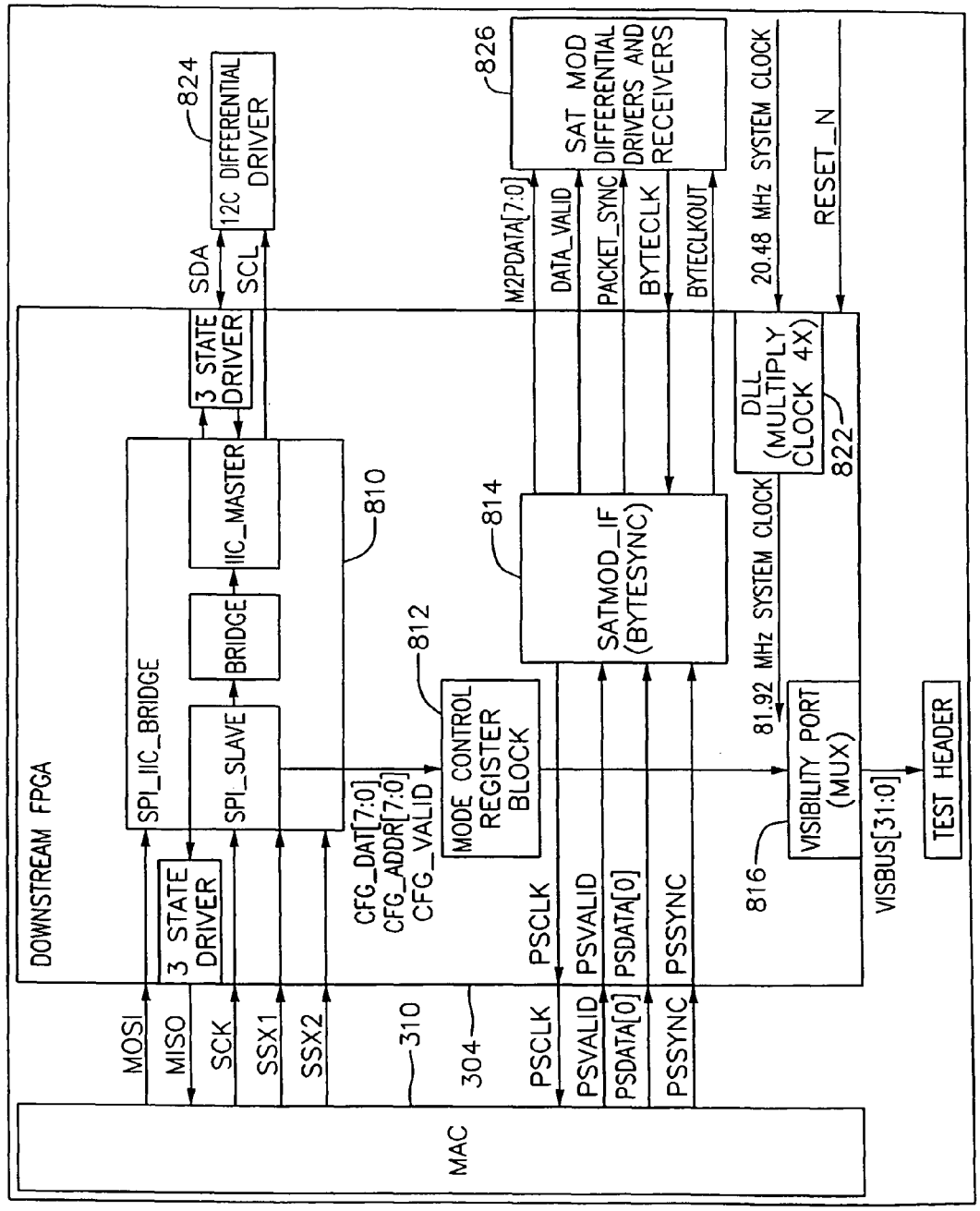
FIG. 8 is an exemplary block diagram of a downstream circuit, according to one embodiment of the present invention.

FIG. 8 is an exemplary block diagram of a Downstream FPGA (e.g., 304 in FIG. 3), according to one embodiment of the present invention. As shown in FIG. 8, the Downstream FPGA converts the MPEG bit stream from the MAC 310 into a byte wide stream for the satellite modulator 204 differential drivers and receivers input 826. The byte wide output is synchronized to the byte source clock from the satellite modulator by synchronization block 814. In the SMTS test mode, the Downstream FPGA connects the MAC downstream interface to a QAM modulator (i.e., 312 in FIG. 3). An example of this QAM modulator 312 is the BCM3033 Modulator chip from Broadcom Corp. Since the satellite modulator 204 uses an I2C interface for control, the Downstream FPGA also acts as a SPI to I2C bridge using bridge circuitry 810 to convert the SPI format data to I2C data for the I2C differential drivers of the satellite modulator 204. Downstream FPGA passes host instructions from the MAC SPI interface to satellite modulator 204.

The QAM modulator 312 is connected to the Downstream FPGA 304 to facilitate DOCSIS SMTS mode testing. The serial bit rate out of the MAC 310 should be great enough to keep up with the expected transmitted bit rate of the QAM modulator 312. The maximum bit rate occurs for the 8PSK rate ⅚ Turbo Trellis Code. For example, at 15 Msym/sec, the MAC bit rate is 34 Mbps. A pulse swallowed bit clock locked to the byte clock is used to drive the MAC serial interface. A visibility port (multiplexor) 816 and a mode control register block 812 provides testing capabilities for the Downstream FPGA.

In one embodiment, the Downstream FPGA provides the interface between the MAC/Demod board in the PCI chassis and the satellite modulator unit. The data interface connects to the M2P Interface of the modulator board. A single-ended to differential converter between the FPGA and the output connector provides the necessary RS422 differential drive. A differential receiver converts the satellite modulator byte clock to a single ended signal for input to the Downstream FPGA.

TABLE 9

Downstream FPGA Interfaces

| Module Name | Description |
| --- | --- |
| MAC | Serial data interface (Input)<br>SPI Serial Control Interface (Input/Output) |
| Modulator | Parallel MPEG Data (M2P Interface) (Output)<br>Byte Clock (Input)<br>I2C (Input/Output) |
| QAM Modulator | Serial Data Interface. Clock sourced from the MODULATOR. The FPGA routes signals between the MODULATOR and the MAC. |

In one embodiment, the Upstream FPGA (e.g., 309 in FIG. 3) includes the following functions:

1) Read and store MAP information from the MAC. Modify MAP data for the burst demodulator to accommodate Data Requests and Ranging Opportunities.
2) Read in soft decisions from burst demodulator test port.
3) Buffer soft decisions to accommodate turbo decoder delay
4) Reformat soft decision data from for example, a [2.9] to a [1.7] word format.
5) Send soft decision data to turbo decoder and retrieve decoded data. The turbocode interface should have a bypass mode.
6) Decode and buffer prepend data from burst demodulator.
7) Pass decoded data through the descrambler. The descrambler may be bypassed by setting the seed byte to 0.
8) Convert the decoded data bits to bytes and pass it through the deinterleaver and Reed Solomon decoder. Both the deinterleaver and decoder should have bypass modes.
9) Update prepend data according to FEC status and insert updated prepend data to decoded data
10) Remove any RS pad bytes inserted at transmitter. This can be done based on examination of the DOCSIS MAC Header.
11) FPGA configurable with SPI Interface from MAC
12) Test interface with external RAM
13) Interface with burst demodulator FFT interface. Should include the ability to retrieve and store FFF data into a RAM for post processing.
14) I2C slave interface with turbo decoder master interface.
15) Interface to the burst demodulator MAC interfaces for both Channel A and B. This is intended to allow the MAC to receive satellite data on either Channel A or Channel B.
16) Test individual modules (such as the turbo decoder interface, RS decoder, deinterleaver module, prepend filtering and insertion, overall FPGA with known test data vectors)

TABLE 10

FPGA Module Descriptions and Interfaces

| Module Name | Description |
|---|---|
| MAC | MAP Interface (Input) |
| | Serial Data Interface (Output) |
| | SPI Serial Control Interface (Input/Output) |
| BURST | Serial Data Interface (Input) |
| DEMODULATOR | Demodulated Data (11 bit I and Q), data valid, symbol clock (Input) |
| | FFT Interface (Input) |
| TURBO DECODER | 8 bit I and Q, data valid, symbol (Output) |
| | Decoded data, serial interface (Input) |
| | I2C Interface (Input/Output) |
| Memory | RAM address, data and write enable |

Figure 9:
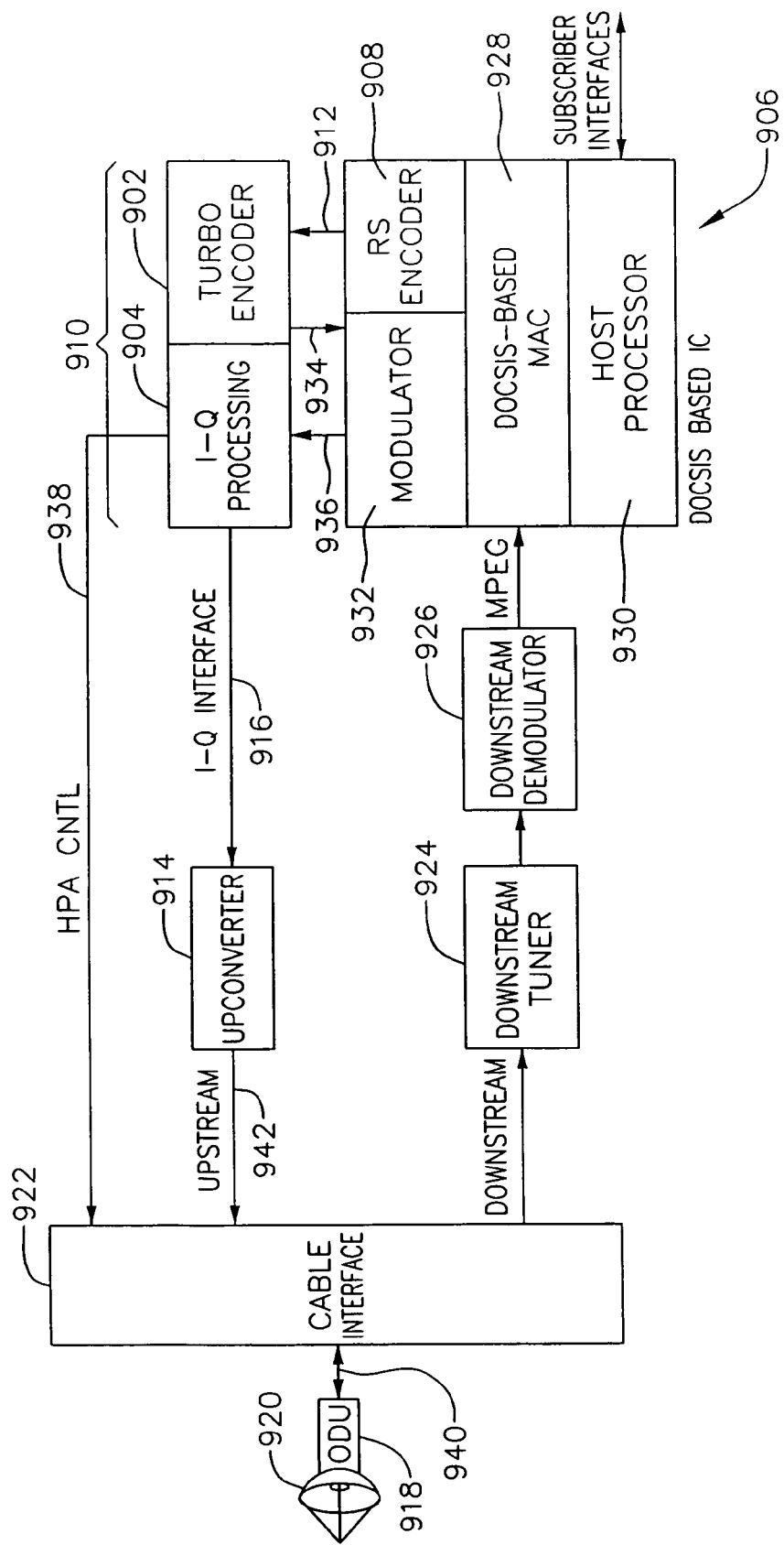
FIG. 9 is an exemplary block diagram of a satellite modem, according to one embodiment of the present invention.

FIG. 9 illustrates an exemplary block diagram of a satellite modem (e.g., 208 in FIG. 2), according to one embodiment of the present invention. The satellite modem includes a DOCSIS based circuit 906, which can be a conventional DOCSIS based circuit. In the example of FIG. 9, the DOCSIS based circuit 906 is illustrated as an integrated circuit. Alternatively, the DOCSIS based circuit 906 can include a number of integrated circuits and/or discrete circuits and/or software/firmware.

The DOCSIS based circuit 906 includes a host processor 930 coupled to a DOCSIS based MAC 928. The DOCSIS based MAC 928 interfaces with an application executing on the host processor 930. The DOCSIS based MAC 928 formats data in accordance with DOCSIS standards. The host processor 930 interfaces with a subscriber unit such as a personal computer (not shown in FIG. 9). The DOCSIS based circuit 906 further includes a RS encoder 908 and a modulator 932, both of which are described below.

The DOCSIS based MAC 928 also interfaces with a transmit path and a receive path. In the example of FIG. 9, the receive path includes a downstream tuner 924 and a downstream demodulator 926. The transmit path includes the RS encoder 908, the modulator 932, a turbo encoder I-Q interface circuit 910, and an up-converter 914. The turbo encoder I-Q interface circuit 910 includes a turbo encoder 902 and an I-Q processing module 904. In the example of FIG. 9, the turbo encoder I-Q interface circuit 910 is illustrated as an integrated circuit. Alternatively, the turbo encoder I-Q interface circuit 910 includes multiple integrated circuits and/or discrete components.

The transmit and receive paths are coupled to an outdoor unit (ODU) 918, which includes an antenna 920, through a cable interface 922. The ODU 918 typically includes a power amplifier in the transmit path.

Turbo encoding is now described. Turbo encoders typically use at least two convolutional component encoders. Turbo encoders can also be based on block encoding techniques, such as Hamming codes. Turbo codes include, for example, and without limitation, Parallel Concatenated Convolutional Codes (PCCC), Serial Concatenated Convolutional Codes (SCCC), and Hybrid Concatenated Convolutional Codes (HCCC). Turbo codes may also be non-systematic. Turbo codes are practical codes due to their performance at low SNR.

The invention is not, however, limited to a PCCC turbo encoder. Based on the description herein, one skilled in the relevant art(s) will understand that other turbo encoders and other turbo-encoder schemes can be uses. Turbo encoders are described in:

Valenti, Matthew C., "Turbo Codes and Iterative Processing," Mobile and Portable Radio Research Group, Virginia Polytechnic Institute and State University, Blacksburg, Vap;

"Research and Development: Communications/Turbo Coding," Xenotran, http://xenotran.com/turbo tech error turbo.html, Mar. 11, 2002;

W. E. Ryan, "A Turbo Code Tutorial," Proc. IEEE Globecom '98, 1998; and

"Telecomunications and Mission Operations Directorate—DSN Technology Program: Communications Systems Analysis: Turbo Codes," http//www331.jpl.nasa.gov/public/TurboForce.GIF, Mar. 3, 2002.

All of which are hereby incorporated by reference in their entireties.

Referring back to FIG. 9, the satellite modem combines an inner turbo code with conventional DOCSIS based RS encoding. The satellite modem thus implements a concatenated RS forward error correction (FEC) encoding in the transmit path. Other FEC codes can be used. In particular, the inner turbo code could be replaced with a conventional convolutional code. The outer RS code could be removed leaving only the inner turbo code. The latter arrangement is just a subset of the RS-turbo concatenated approach where the error correcting ability "T" of the RS code is set to zero. A driving idea in satellite applications is to use FEC codes that allow efficient operation in lower SNR environments than is generally possible with RS codes alone.

Figure 10:
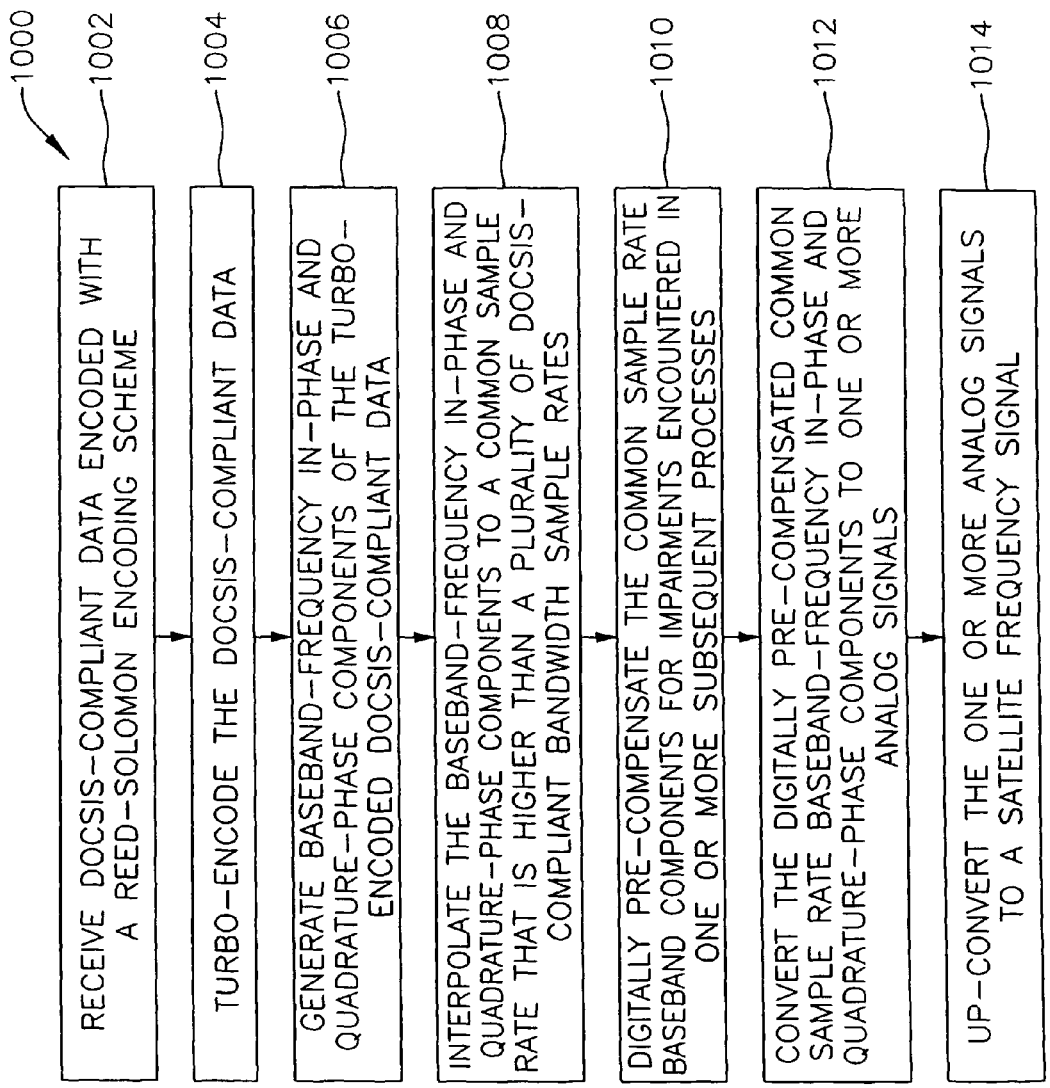
FIG. 10 is an exemplary process flow chart for modifying DOCSIS transmission paths for wireless environments, according to one embodiment of the present invention.

FIG. 10 is an exemplary process flow chart 1000 for modifying DOCSIS transmission paths for wireless environments, according to one embodiment of the present invention. The process flowchart 1000 is described with reference to one or more of FIGS. 1-9. The process flowchart 1000 is not, however, limited to the examples provided in FIGS. 1-9. Based on the description herein, one skilled in the relevant art(s) will understand that the process flowchart 1000 can be implemented in other environments as well.

The process begins at block 1002, which includes receiving DOCSIS-compliant data encoded with a RS encoding scheme. In the example of FIG. 9, the turbo encoder I-Q interface 910 receives RS encoded DOCSIS-compliant data 912 from the encoder 908. In block 1004, the DOCSIS-compliant data is turbo-encoded. In the example of FIG. 9, the encoder 902 turbo encodes the RS encoded DOCSIS-compliant data 912.

Block 1006 includes generating baseband-frequency in-phase and quadrature-phase components of the turbo-encoded DOCSIS-compliant data. In FIG. 9, the modulator 932 receives and modulates the data burst 934 in FIG. 9. The modulator 932 outputs complex baseband I-Q waveform 936 to the I-Q processing module 904.

Block 1008 includes interpolating the baseband-frequency in-phase and quadrature-phase components to a common sample rate that is higher than a plurality of DOCSIS-compliant bandwidth sample rates. An I and a Q interpolation filters interpolate the complex baseband I-Q waveform 936 to a common sample rate.

Block 1010 includes digitally pre-compensating the common sample rate baseband-frequency in-phase and quadrature-phase components for impairments encountered in one or more subsequent processes. In FIG. 9, the I-Q processing module 904 may optionally include one or more of the I and Q multiply-by-complex exponentials modules, the I and Q amplitude and phase offset modules, the I and Q x/sin(x) modules, and the I and Q rounding modules.

Block 1012 includes converting the digitally pre-compensated common sample rate baseband-frequency in-phase and quadrature-phase components to one or more analog signals.

In FIG. 9, digital-to-analog conversion is performed within the turbo encoder I-Q interface 910, which can be a single integrated circuit, in the up-converter 914, or in between the turbo encoder I-Q Interface 910 and the up-converter 914.

Block 1014 includes up-converting the one or more analog signals to a satellite frequency signal. In FIG. 9, up-conversion is performed by the up-converter 914 and the ODU 918. Up-conversion can be performed in a single step or in a plurality of up-conversion steps. A combination of the up-converter 914 and the ODU 918 outputs a satellite frequency DOCSIS based signal 942 to the antenna 920.

Conventional DOCSIS systems encode data with RS encoding. This is sufficient for relatively low noise environments, such as cable modem systems. For higher noise environments, however, additional RS encoding may not be sufficient. In accordance with one embodiment of the present invention, RS encoded data is further encoded in an inner turbo code.

Figure 11:
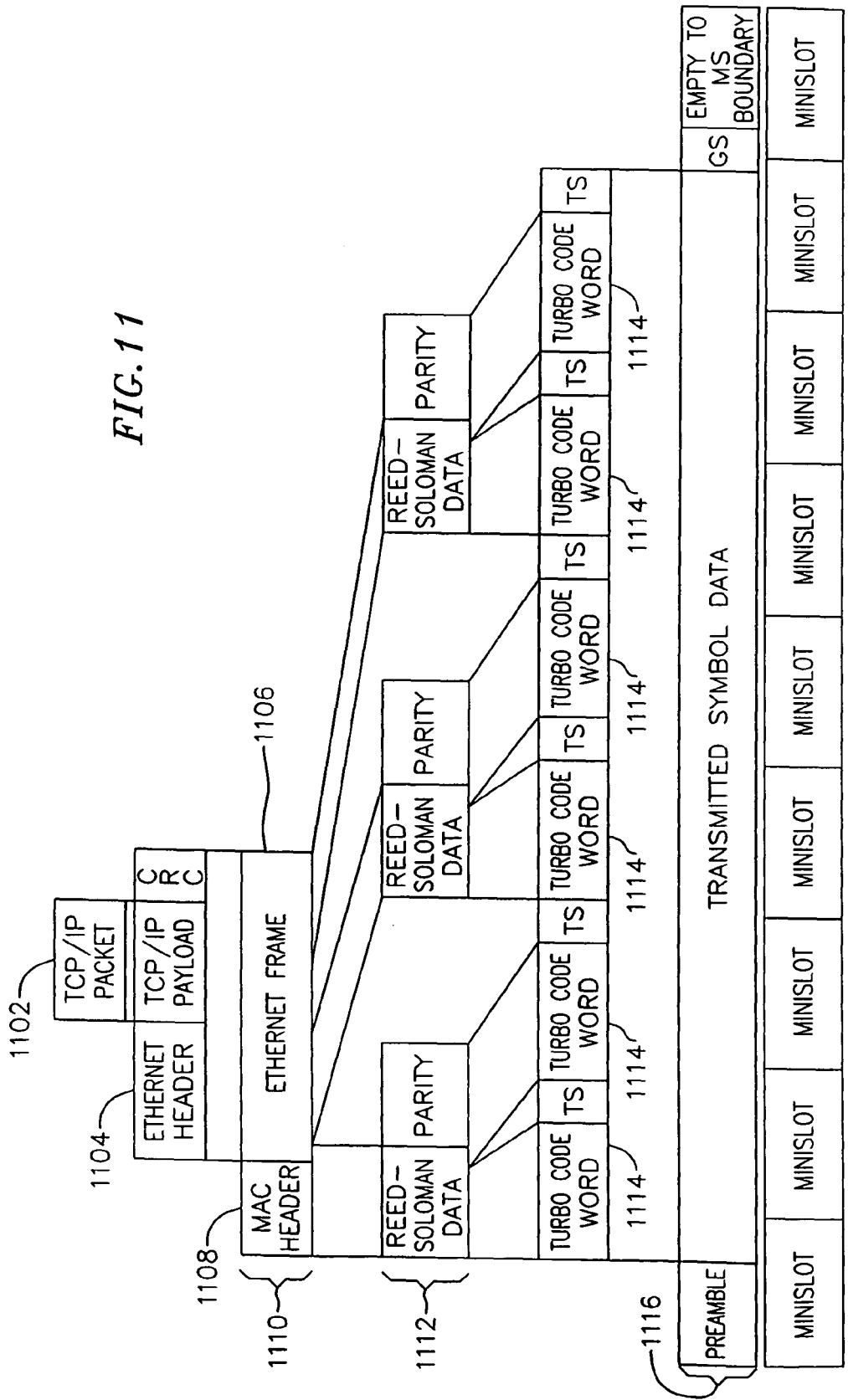
FIG. 11 illustrates how the upstream data is encoded as it passes through the various blocks, according to one embodiment of the present invention.

FIG. 11 illustrates how the upstream data is encoded as it passes through the various blocks, according to one embodiment of the present invention. As a result of this process, data bursts having RS and turbo encoding are generated. The process begins with a transmission control protocol/internet protocol ("TCP/IP") packet 1102. Ethernet header information 1104 is prepended to the TCP/IP packet 1102, resulting in an Ethernet frame 1106. DOCSIS MAC header information 1108 is appended to the Ethernet frame 1106. These two steps result in DOCSIS packets 1110.

RS encoding is applied to the DOCSIS packets 1110 by the RS encoder (e.g., 908 in FIG. 9). This results in RS code words 1112. The RS code words 1112 are provided to a turbo encoder (e.g., 902 in FIG. 9). In the turbo encoder, the RS code words 1112 are encoded by the inner turbo code into turbo code words 1114. Optional tailing symbols (TS) are appended to the turbo code words 1114. The tailing symbols are used to drive turbo code blocks to a known state for proper decoding. These count as overhead symbols but not as turbo code word symbols.

RS code word lengths and turbo code word sizes are preferably selected such that each RS code word results in an integer number of turbo code words. For example, if a rate ½ turbo code word size contains 280 QPSK symbols, then the turbo code word contains 280 RS bits (35 bytes) from the outer code and 280 turbo code parity bits. If there are to be two turbo code words per RS code word, then the RS code word size is selected to be 70 bytes. Other sizes and combinations are possible. The turbo code words 1114, appended with tailing symbols, are then output from the turbo encoder. A preamble is appended to the turbo code word, resulting in the data burst 1116. This can be performed as in conventional DOCSIS systems.

The resulting data burst 1016 is modulated in the modulator (e.g., 932 in FIG. 9). Modulation may include symbol mapping, Nyquist filtering and interpolation. Insertion of the preamble may also occur in the modulator 932. The modulation can be performed as in conventional DOCSIS systems. The modulation provides a complex baseband I-Q waveform (e.g., 936 in FIG. 9) to the I-Q processing module (e.g., 904 in FIG. 9). The complex baseband I-Q waveform 336 is provided to the I-Q processing module 904 for further processing.

Figure 12:
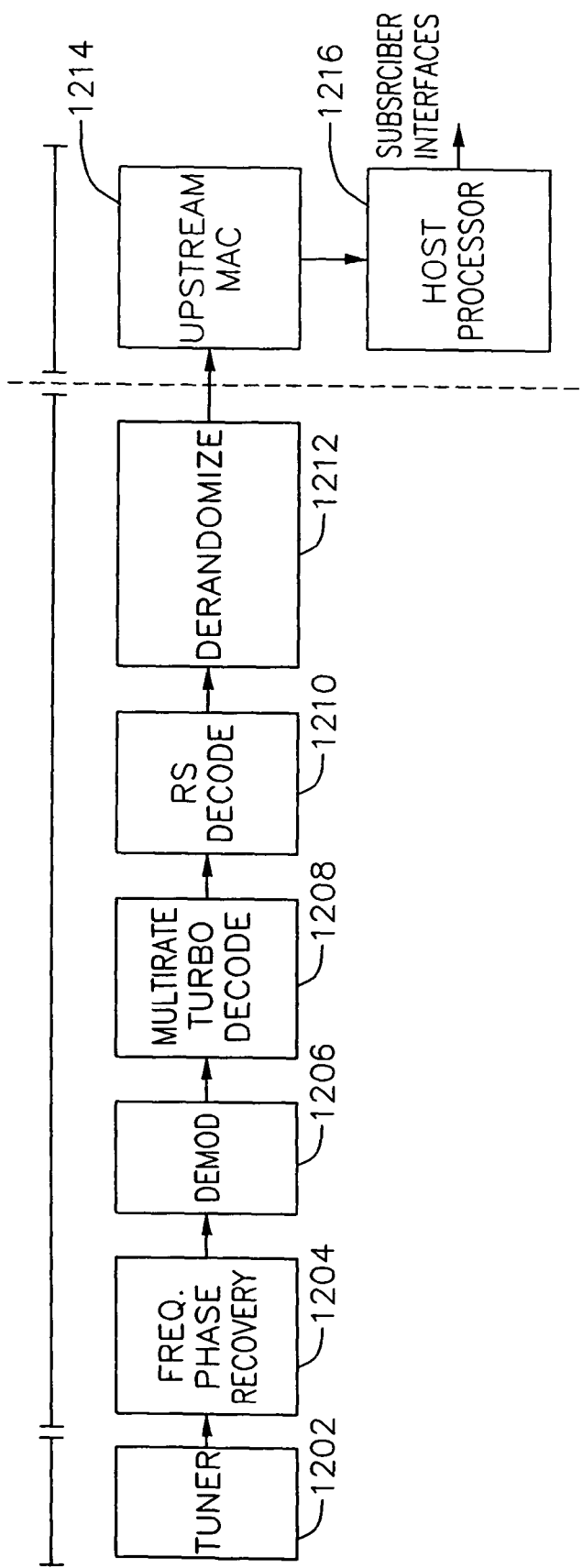
FIG. 12 is a simplified exemplary block diagram of downstream processing blocks of a satellite modem, according to one embodiment of the present invention.

FIG. 12 shows simplified downstream processing blocks of a SM, according to one embodiment of the present invention. In one embodiment, the receiver supports multiple data queues where the data from each queue is transmitted using different modulation and coding depending on the reception capabilities of the intended receiver. Thus, data intended for receivers with a high SNR can be transmitted using a higher modulation and code rate. The data intended for receivers with a low SNR can be transmitted using a lower modulation and code rate. As shown in FIG. 12, the phase & frequency of the data received from tuner 1202 is recovered by frequency/phase recovery unit 1204, and the resulting signal is demodulated by a variable demodulator 1206. The demodulated signal is then fed to the multirate turbo decoder 1208 and RS decoded by RS decoder 1210. The RS decoded signal is then derandomized by unit 1212, before it is sent to Upstream MAC 1214 and host processor 1216.

Figure 13:
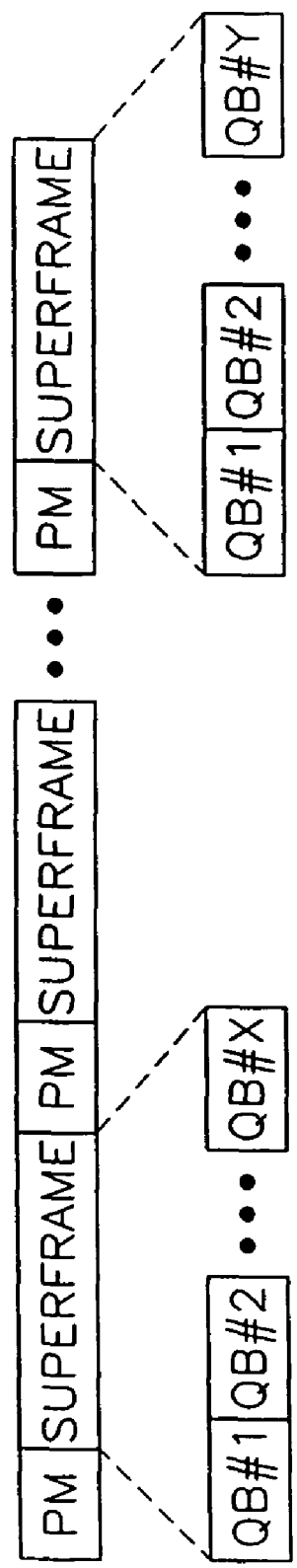
FIG. 13 is an exemplary diagram illustrating downstream data stream composed of map messages (PHY-MAPs) and Superframes, according to one embodiment of the present invention.

The downstream data stream is composed of map messages (PHY-MAPs) and Superframes, as shown in FIG. 13. Each Superframe is composed of an integer number of Queue Blocks (QB), where each Queue Block is a block of data taken from a given queue and transmitted using the modulation and code rate selected for that particular queue. Superframes can have a variable length depending on the number and type (i.e., modulation and code rate) of Queue Blocks from which it is composed. Each Superframe has an associated PHY-MAP that specifies the number and type of Queue Blocks within the Superframe.

One purpose of the PHY-MAP is to pass the Queue Block descriptors to the receiver. The PHY-MAP is one MPEG frame in length (0x47 sync byte followed by a 3 byte header and 184 bytes of data) and is transmitted using a QPSK rate ¼ code to ensure that all receivers are able to decode the PHY-MAP (the QPSK rate ¼ code threshold is 0.4 dB C/N, well below the lowest rate queue of QPSK rate ½ with code threshold at 2.2 dB C/N). Table 11 below specifies an exemplary format of the PHY-MAP, according to one embodiment of the invention. The first three bytes are the standard MPEG frame header. The 64-bit PHY-MAP unique word is used to identify the PHY-MAP to the receiver. The queue block counter is a 16-bit rolling counter that counts the Queue Blocks (QB) being sent through the system. The counter value specifies the count for the first QB in the Superframe. This counter is used to sync the receiver to the headend and to make sure that no PHY-MAPs are missed by the receiver. The QB descriptor tells the receiver the modulation and code rates for QBs contained in the following Superframe. The PHY-MAP terminator specifies the end of useful data in the PHY-MAP. Any additional unused bits in the MPEG frame is zero-padded.

TABLE 11

PHY-MAP Format

| Description | # of bits | Value |
|---|---|---|
| MPEG Sync Byte | 8 | 0 × 47 |
| Transport Error Indicator | 1 | 0 |
| Payload Unit Start Indicator | 1 | |
| Transport Priority | 1 | 0 |
| PID | 13 | |
| Transport Scrambling Control | 2 | 00 |
| Adaptation Field Control | 2 | 01 |
| Continuity Counter | 4 | |
| PHY-MAP Unique Word | 64 | — |
| Queue Block Counter | 16 | — |
| Queue Blocks Descriptor | — | — |
| PHY-MAP Terminator | — | — |

The length of each QB should be an integer number of RS blocks. Table 12 below shows an example of possible operating parameters for several multirate queues assuming each QB contains 12 RS blocks.

TABLE 12

Example Queue Operating Parameters

| Modulation/Code Rate | Operating Point (C/N dB) | # RS Blocks per Queue Block | # MPEG Frames per Queue Block | Spectral Efficiency (bits/symbol) |
|---|---|---|---|---|
| QPSK 1/2 | 2.2 dB | 12 | 78 | 0.881 |
| QPSK 3/4 | 5.1 dB | 12 | 78 | 1.309 |
| 8PSK 2/3 | 7.6 dB | 12 | 78 | 1.799 |
| 8PSK 5/6 | 10.4 dB | 12 | 78 | 2.159 |

Table 13 is an exemplary downstream specifications of input RF interface.

TABLE 13

Downstream Specifications of Input RF Interface

| Parameter | Min. | Typ | Max | Comments |
|---|---|---|---|---|
| Frequency range (MHz) | 940 | | 1460 | Range of center frequencies is 950 to 1450. Additional range account for frequency uncertainty |
| Frequency Offset (MHz) | | | +/−6.7 | |
| Frequency Drift (kHz/sec) | | | 6.4 | |
| Input Level (dBm) | −50 | | −25 | |
| Input VSWR | | | 2.0:1 | 75 Ω Source. |
| Total spurious at SM input (dBm) | | | −65 | Spurious generated by satellite modem. 950 to 1450 MHz |
| Noise Figure (dB) | | 10 | 12 | |
| Phase noise (dBc/Hz) | | | | Expected phase noise on input signal |
| @ 100 Hz offset | | | −30 | |
| @ 1 kHz offset | | | −60 | |
| @ 10 kHz offset | | | −77 | |
| @ 100 kHz offset | | | −92 | |
| @ 1 MHz offset | | | −112 | |
| @ >10 MHz offset | | | −137 | |
| IF Bandwidth (MHz) | | 18 | 25 | |
| Gain slope (dB) | | | 5 | Across nominal signal BW |
| Group Delay (nsp-p) | | | 50 | Total variation within IF BW |
| Turbocode rates | | | | |
| QPSK | | ½ | | |
| QPSK | | ¾ | | |
| 8PSK | | ⅔ | | |
| 8PSK | | ⅚ | | |

Figure 14:
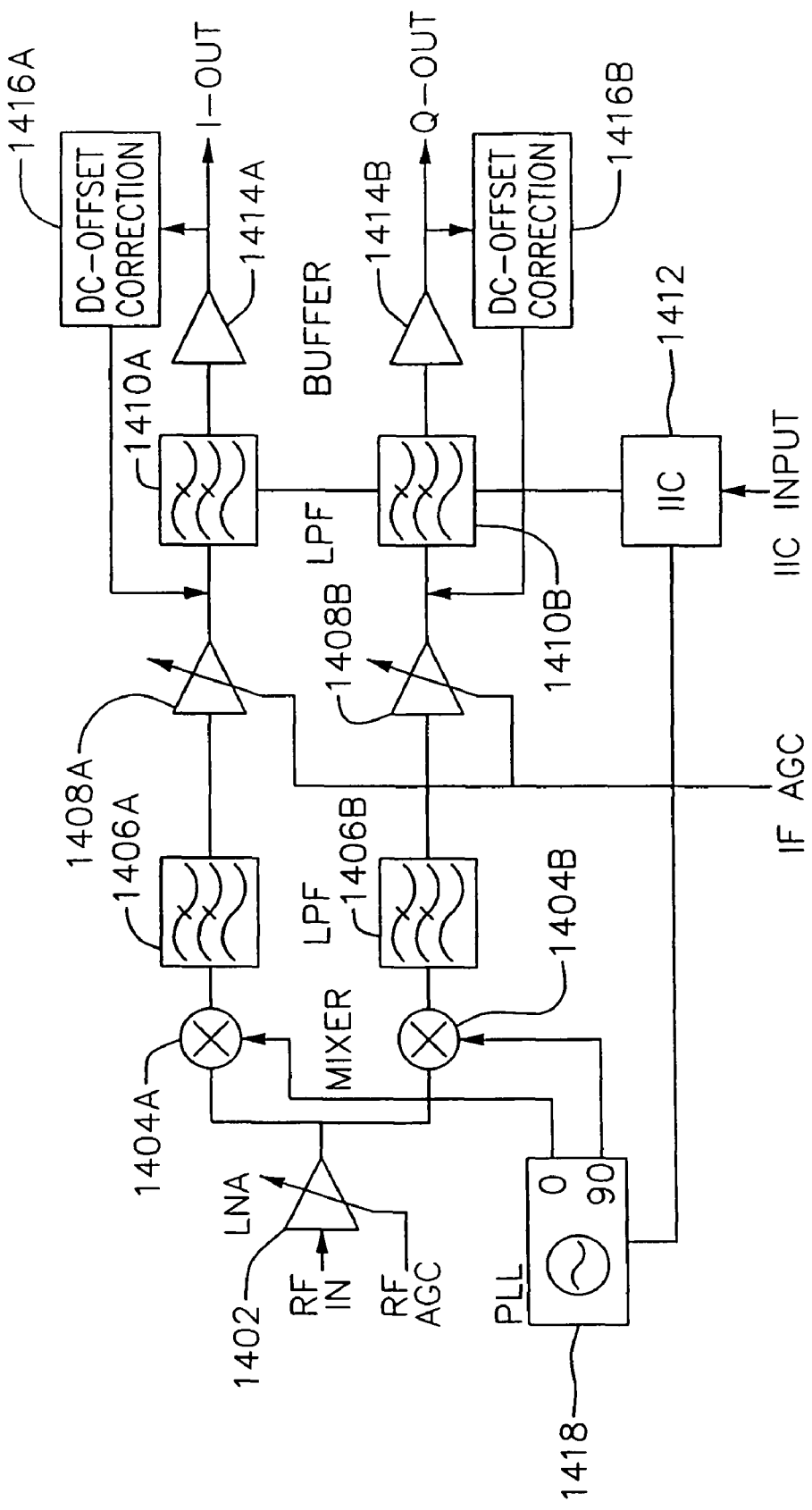
FIG. 14 shows an exemplary block diagram of a direct conversion satellite tuner with I and Q baseband outputs, according to one embodiment of the present invention.

FIG. 14 shows a block diagram of a direct conversion satellite tuner with I and Q baseband outputs, according to one embodiment of the present invention. An exemplary direct conversion satellite tuner is the BCM3440 chip from Broadcom Corp. The tuner is capable of selecting channels from the input frequency range of 950 MHz to 2150 MHz and supports applications with output data rates ranging from 1 Mbaud to 45 Mbaud. The tuner takes in a differential L-band signal from, for example, standard consumer-grade LNB devices. A LNA 1402 is controlled by an automatic gain controller (AGC), (not shown) to provide wide tuner dynamic range. A direct conversion architecture is used to convert the L-band signal to in-phase and quadrature base band signals. The signals required for direct conversions are generated by a PLL and a quadrature LO generator 1418. These signals are mixed with the L-band input by mixers 1404a and b, and then filtered by low-pas filters 1406a and b to remove the upper image produced by the mixer. Variable gain amplifiers 1408a and b are used to adjust the baseband signal levels before processing by the channel selection filters 1410a and b, to optimize noise performance and prevent distortion within the filters.

Channel selectivity is performed using register programmable 5$^{th}$ order Butterworth low-pass filters 1410a and b. Filter tuning and channel selection are controlled by setting registers using the I2C two-wire serial bus interface 1412. DC-Offset correction units 1416a and b correct any DC voltage offset at the inputs of the channel selection filters 1410a and b. The satellite tuner supports 8PSK, QPSK, or BPSK demodulation with a nominal AGC range of 60 dB.

Satellite Tuner Specifications

TABLE 14

Satellite Tuner Key Specifications

| Parameter | Min. | Typ. | Max | Comments |
|---|---|---|---|---|
| Frequency range (MHz) | 950 | | 2150 | |
| Input Level (dBm) | −70 | | −25 | Total input power (22 MHz bandwidth) |
| Input VSWR | | | 2.0:1 | 75 Ω Source. |
| Gain (dB) | | 23 | 78 | Controlled via RF and IF AGC signals generated in the satellite receiver |
| Gain Variation (dB) | | −2 | 2 | |

TABLE 14-continued

Satellite Tuner Key Specifications

| Parameter | Min. | Typ. | Max | Comments |
|---|---|---|---|---|
| Total spurious at RF input (dBm) | | | −65 | Spurious generated prefrably, from 950 to 2150 MHz |
| Noise Figure (dB) | | 10 | 12 | |
| 3rd Order Intercept Point (dBm) | | | −31.4 | @ maximum gain, in-band |
| | | | 10.6 | @ minimum gain, in-band |
| | | | 13.25 | @ minimum gain, out-of-band |
| LO Step size (MHz) | 2 | 4 | 8 | |
| Phase noise integrated from 2.5 kHz to 41 MHz (degrees rms) | | 1.5 | | |
| Phase noise (dBc/Hz) | | | | Phase noise generated by the satellite tuner |
| @ 10 kHz offset | −100 | −95 | | |
| @ 100 kHz offset | −100 | −95 | | |
| @ 1 MHz offset | −115 | | | |
| LO Lock-up time (ms) | | 7 | 10 | |
| Quadrature Phase Imbalance (degrees) | | | ±2 | 300 kHz to 22 MHz |
| Quadrature Amplitude Imbalance (dB) | | | ±1 | 300 kHz to 22 MHz |
| IF Bandwidth (MHz) | 1 | | 36 | Programmable LPF, 1 MHz steps |
| IF Filter Stop-band Rej. (dB) | −35 | | | |
| Amplitude Ripple (dB) | | | ±1.0 | 300 kHz to 22 MHz |
| Group Delay (nsp-p) | | | 50 | Total variation within IFBW |

Satellite Tuner—Satellite Receiver Interface

I-Q DATA INTERFACE

| Parameter | Value | Comments |
|---|---|---|
| IQ Output Level | 1.0 Vpp (typical) | |
| IQ Output Impedance | 250 ohms (typical) | |
| IQ DC output | 1.15 Vdc (typical) | |
| Frequency offset (MHz) | 15 (max) | |

The digital satellite receiver supports QPSK and 8PSK modulation with concatenated RS-turbo decoded error correction coding. An exemplary digital satellite receiver is the BCM4510 chip from Broadcom Corp., which is a single chip digital satellite receiver supporting QPSK and 8PSK modulation with concatenated RS-turbo decoded error correction coding. The description of this digital satellite receiver is identical to the turbo decoder that was described above in FIG. 7. In one embodiment, the digital satellite receiver integrates dual 8-bit A/D converters, an all-digital variable rate QPSK/8PSK receiver, a turbo decoder, and a RS decoder. All required RAM is integrated and all required clocks are generated on chip from a single reference crystal. The analog waveforms are fed into the receiver, where they are sampled by the integrated A/D converters, digitally mixed to baseband, resampled, and filtered by dual square-root Nyquist filters, as shown in FIG. 7 and described above. Optimized soft decisions are then fed into a turbo/RS decoder. The final error-corrected output is delivered in MPEG-2 transport format.

The phase/frequency recovery module 712 is capable of removing residual phase and frequency offsets in the baseband signal of up to ±15 MHz and can track changes in frequency and phase due to local oscillator drift in the tuner and LNB. The variable rate filters, which are under the control of the symbol timing recovery loop, resample the input data at the correct frequency and phase to ensure that properly sampled symbols are input to the matched filters. The matched filters comprise of dual square-root Nyquist filters programmable with a 20%, 25%, or 35% excess bandwidth factor. The digital satellite receiver provides a 12-tap decision-directed equalizer. Further, the digital satellite receiver includes two AGC loops which allow the control of both RF and IF variable gain amplifiers (VGAs) in the satellite tuner. The amount of gain control allocated to each loop can be set via the host bus interface. Each AGC loop examines the power of the digitized baseband input signal and compares it to a programmable loading factor. The gain error is fed into a digital loop filter and is converted to an analog voltage by an on-chip delta-sigma modulator and an off-chip passive filter. This voltage may then be used to control a variable gain amplifier or variable attenuator to optimally load the A/D converters. This loop may be frozen or reset independent of the other synchronization loops.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents and alternatives falling within the spirit and scope of the present invention as defined by the claims.

What is claimed is:

1. A satellite communication system, comprising:
a satellite earth station operably coupled to at least one data network; and
a plurality of satellite modems, each satellite modem configured to communicate with the satellite earth station via at least one servicing satellite,
wherein the satellite earth station includes:
a host processor configured to receive data packets from the at least one data network,
a Data Over Cable Service Interface Specification (DOCSIS) Media Access Control (MAC) configured to format the data packets into one or more Moving Picture Experts Group (MPEG) frames,
a satellite modulator, coupled to the DOCSIS MAC, configured to modulate the one or more MPEG frames based upon a selected modulation scheme from among a plurality of modulation schemes and a selected code rate from among a plurality of code rates to provide downstream output data for transmission to at least one of the plurality of satellite modems, the satellite modulator including:
- a plurality of queues, each queue configured to store the one or more of the MPEG frames based upon a modulation scheme and a code rate to provide a queue block of data, the plurality of queues being configured such that each queue corresponds to a possible combination of modulation scheme and code rate among a plurality of possible combinations of modulation schemes and code rates,
- a multirate turbo encoder configured to receive the queue block of data from a selected queue from the plurality of queues and to encode the queue block of data using the code rate associated with the selected queue to provide an inner encoded data block,
- a modulator configured to modulate the inner encoded data block using the modulation scheme associated with the selected queue to provide the downstream output data.

2. The satellite communication system of claim 1, wherein the data network includes an Ethernet network.

3. The satellite communication system of claim 1, further comprising:
- a Reed-Solomon (RS) encoder configured to receive the queue block of data from the selected queue and to encode the queue block of data using the code rate associated with the selected queue to provide an outer encoded data block, wherein the multirate turbo encoder is configured to receive the outer encoded data block and to encode the outer encoded data block using the code rate associated with the selected queue to provide the inner encoded data block.

4. The satellite communication system of claim 1, wherein the DOCSIS MAC comprises:
- a SPI controller configured to support at least one downstream;
- an encryption engine configured to encrypt the data packets to provide one or more encrypted data packets;
- an insertor configured to frame the one or more encrypted data packets in MAC headers to provide encapsulated data packets;
- a timing generator configured to insert DOCSIS time stamps in the encapsulated data packets at programmable intervals to provide stamped data packets; and
- a formatter configured to format the stamped data packets into the one or more MPEG frames.

5. The satellite communication system of claim 1, further comprising:
- a serial to parallel interface configured to format the one or more MPEG frames into one or more parallel MPEG frames, the satellite modulator being configured to modulate the one or more parallel MPEG frames based upon the selected modulation scheme and the selected code rate.

6. The satellite communication system of claim 1, further comprising:
- a randomize unit configured to randomize the queue block of data from the selected queue to provide a randomized queue block of data, wherein multirate turbo encoder is configured to encode the randomized queue block of data using the code rate associated with the selected queue to provide the inner encoded data block.

7. The satellite communication system of claim 1, further comprising:
- a block header insert module configured to insert a block header into the inner encoded data block.

8. The satellite communication system of claim 1, further comprising:
- a second modulator configured to modulate the downstream output data to an intermediate frequency (IF).

9. The satellite communication system of claim 1, wherein the plurality of modulation schemes includes at least one of a group consisting of:
- quadraphase-shift keying (QPSK); and
- 8 Phase-Shift Keying (8PSK).

10. The satellite communication system of claim 1, wherein the plurality of code rates includes at least one of a group consisting of:
- $\frac{1}{2}$;
- $\frac{2}{3}$;
- $\frac{3}{4}$; and
- $\frac{5}{6}$.

11. The satellite communication system of claim 1, wherein the multirate turbo encoder is configured to appended one or more tailing symbols (TS) to the inner encoded data block, the one or more tailing symbols (TS) being used to drive the inner encoded data to a known state for proper decoding.

12. The satellite communication system of claim 1, wherein the queue block of data is part of a plurality of queue blocks of data, the satellite modulator being configured to group one or more of the plurality of queue blocks of data to provide a superframe.

13. The satellite communication system of claim 12, wherein the one or more of the plurality of queue blocks of data are taken from two or more queues from the plurality of queues, each of the two or more queues from the plurality of queues being associated with a different modulation scheme and a different code rate.

14. The satellite communication system of claim 12, wherein the satellite modulator is configured to append one or more map messages (PHY-MAPs) to the superframe to provide the downstream output data.

15. The satellite communication system of claim 14, wherein the one or more PHY-MAPs specify the modulation scheme and the code rate for each of the queue blocks of data from the superframe.

* * * * *

UNITED STATES PATENT AND TRADEMARK OFFICE
CERTIFICATE OF CORRECTION

PATENT NO.       : 7,738,596 B2                                    Page 1 of 1
APPLICATION NO.  : 10/661648
DATED            : June 15, 2010
INVENTOR(S)      : Lin et al.

It is certified that error appears in the above-identified patent and that said Letters Patent is hereby corrected as shown below:

Column 5
Line 46, "tranmistter" should read --transmitter--.

Column 5
Line 48, "guadraphase" should read --quadraphase--.

Column 11
Line 16, "programmer" should read --programming--.

Column 12
Line 58, "FFF" should read --FFT--.

Column 14
Line 9, "Telecomunications" should read --Telecommunications--.

Column 19
In Table 14, under "Comments", line 1, "prefrably," should read --preferably,--.

Signed and Sealed this

Thirtieth Day of November, 2010

David J. Kappos
*Director of the United States Patent and Trademark Office*